US012090785B2

(12) United States Patent
Yu et al.

(10) Patent No.: US 12,090,785 B2
(45) Date of Patent: Sep. 17, 2024

(54) UNIVERSAL WHEEL ASSEMBLY AND SMART CLEANING DEVICE HAVING SAME

(71) Applicant: Beijing Roborock Technology Co., Ltd., Beijing (CN)

(72) Inventors: Guang Yu, Beijing (CN); Dahong Gong, Beijing (CN); Chang Mi, Beijing (CN); Pan Cheng, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 379 days.

(21) Appl. No.: 17/324,412

(22) Filed: May 19, 2021

(65) Prior Publication Data
US 2021/0276365 A1    Sep. 9, 2021

Related U.S. Application Data

(63) Continuation of application No. PCT/CN2019/119229, filed on Nov. 18, 2019.

(30) Foreign Application Priority Data

Nov. 19, 2018   (CN) .......................... 201821908981.X
Nov. 19, 2018   (CN) .......................... 201821908983.9
(Continued)

(51) Int. Cl.
*B60B 33/00*        (2006.01)
*A47L 11/40*        (2006.01)

(52) U.S. Cl.
CPC ...... *B60B 33/0018* (2013.01); *A47L 11/4072* (2013.01); *B60B 33/0007* (2013.01);
(Continued)

(58) Field of Classification Search
CPC ............ B60B 33/0002; B60B 33/0018; B60B 33/0007; B60B 33/0005; B60B 33/001;
(Continued)

(56) References Cited

U.S. PATENT DOCUMENTS 2,992,449 A * 7/1961 Haydock ............. B60B 33/0002
                                                              16/43
3,249,960 A * 5/1966 Schultz, Jr. ......... B60B 33/0002
                                                              16/37
(Continued)

FOREIGN PATENT DOCUMENTS

CN     202319721 U     7/2012
CN     202345285 U     7/2012
(Continued)

OTHER PUBLICATIONS

Roomba Model 770, first available in 2011, and purchased by Examiner in 2015 (Year: 2015).*
(Continued)

*Primary Examiner* — Jeffrey O'Brien
(74) *Attorney, Agent, or Firm* — Morgan, Lewis & Bockius LLP

(57) ABSTRACT

Embodiments of the present application disclose a universal wheel assembly and a smart cleaning device having the same. The universal wheel assembly includes a rotating shaft support and a universal wheel support. The rotating shaft support is configured to be fixed to a predetermined mounting position. The universal wheel support is connected to the rotating shaft support and is rotatable relative to the rotating shaft support. The universal wheel support is provided with a through hole, and the through hole is used for a mounting tool to pass through to fix the rotating shaft support to the predetermined mounting position.

13 Claims, 19 Drawing Sheets

(30) Foreign Application Priority Data

Nov. 19, 2018 (CN) .......................... 201821908985.8
Mar. 12, 2019 (CN) .......................... 201920314619.8

(52) U.S. Cl.
CPC ...... *B60B 33/0039* (2013.01); *B60B 33/0049* (2013.01); *B60B 33/0068* (2013.01); *B60B 2200/49* (2013.01); *B60B 2310/204* (2013.01); *B60B 2360/10* (2013.01)

(58) Field of Classification Search
CPC ............ B60B 33/0015; B60B 33/0021; B60B 33/0023; B60B 33/0026; B60B 33/0068; A47L 11/4072
See application file for complete search history.

(56) References Cited

U.S. PATENT DOCUMENTS

| | | | | |
|---|---|---|---|---|
| 5,479,677 A * | 1/1996 | Chong | ................ | B60B 33/0002 16/21 |
| 7,441,298 B2 * | 10/2008 | Svendsen | ................ | A47L 9/009 15/49.1 |
| 7,620,476 B2 * | 11/2009 | Morse | ................ | A47L 11/4088 901/1 |
| 8,382,906 B2 * | 2/2013 | Konandreas | .......... | A47L 11/292 15/50.2 |
| 8,417,383 B2 * | 4/2013 | Ozick | ................ | G05D 1/0231 700/258 |
| 8,584,307 B2 * | 11/2013 | Won | ................ | G05D 1/0227 15/340.1 |
| 9,003,599 B1 * | 4/2015 | Fry | ................ | A47L 9/009 16/39 |
| 9,168,785 B2 * | 10/2015 | Spektor | ............. | B60B 33/0081 |
| 9,320,398 B2 * | 4/2016 | Hussey | ............. | A47L 11/4041 |
| 9,457,471 B2 * | 10/2016 | Schnittman | ............ | B25J 9/1694 |
| 9,519,289 B2 * | 12/2016 | Munich | ................ | G05D 1/0274 |
| 9,798,328 B2 * | 10/2017 | Vicenti | ................ | G05D 1/0242 |
| 9,908,366 B2 * | 3/2018 | Bruno | ................ | B60B 33/00 |
| 9,950,563 B2 * | 4/2018 | Tsai | ................ | B60B 33/0002 |
| 10,897,970 B2 * | 1/2021 | Hillaert | ................ | B60B 33/045 |
| 11,592,573 B2 * | 2/2023 | Kearns | ................ | G05D 1/0227 |
| 2003/0061681 A1 * | 4/2003 | Plate | ................ | B60B 33/0002 16/19 |
| 2011/0083298 A1 | 4/2011 | Yan | | |
| 2015/0040346 A1 * | 2/2015 | Tsai | ................ | B60B 33/0021 16/45 |
| 2015/0360512 A1 * | 12/2015 | Tsai | ................ | B60B 33/0018 16/38 |
| 2022/0305679 A1 * | 9/2022 | Li | ................ | B25J 19/022 |

FOREIGN PATENT DOCUMENTS

| | | |
|---|---|---|
| CN | 203780648 U | 8/2014 |
| CN | 206124623 U | 4/2017 |
| CN | 106626976 A | 5/2017 |
| CN | 209489967 U | 10/2019 |
| CN | 209489968 U | 10/2019 |
| CN | 209489969 U | 10/2019 |
| DE | 9408251 U1 | 7/1994 |
| DE | 10045577 A1 | 4/2002 |
| KR | 1998-053584 U | 10/1998 |
| WO | 01/38201 A2 | 5/2001 |
| WO | 2016/145951 A1 | 9/2016 |

OTHER PUBLICATIONS

Extended European Search Report issued in corresponding European Patent Application No. 19886711.1 dated May 31, 2022.
International Search Report issued in related International Patent Application No. PCT/CN2019/119229 dated Feb. 12, 2020.

* cited by examiner

A-A

B-B

A-A

UNIVERSAL WHEEL ASSEMBLY AND SMART CLEANING DEVICE HAVING SAME

The present application claims priority to Chinese Patent Application No. 201821908983.9, filed with the Chinese Patent Office on Nov. 19, 2018 and titled "UNIVERSAL WHEEL ASSEMBLY AND SMART CLEANING DEVICE HAVING SAME"; Chinese Patent Application No. 201821908981.X, filed with the Chinese Patent Office on Nov. 19, 2018 and titled "UNIVERSAL WHEEL ASSEMBLY AND SMART CLEANING DEVICE HAVING SAME"; Chinese Patent Application No. 201821908985.8, filed with the Chinese Patent Office on Nov. 19, 2018 and titled "UNIVERSAL WHEEL ASSEMBLY AND SMART CLEANING DEVICE HAVING SAME"; and Chinese Patent Application No. 201920314619.8, filed with the Chinese Patent Office on Mar. 12, 2019 and titled "UNIVERSAL WHEEL ASSEMBLY AND SMART CLEANING DEVICE HAVING SAME," all of which are incorporated herein by reference in their entireties.

TECHNICAL FIELD

The present application relates to the field of intelligent household technologies, and, more specifically, to a universal wheel assembly and an intelligent cleaning device having the same.

BACKGROUND

A universal wheel assembly may be mounted on an intelligent cleaning device to assist moving and walking of the intelligent cleaning device, or may be mounted on other objects that have a function of moving, such as movable doors, luggage, or other intelligent devices.

SUMMARY

To at least partially solve the foregoing problems, an embodiment of the present application provides a universal wheel assembly, including:
a rotating shaft support, where the rotating shaft support is configured to be fixed to a predetermined mounting position; and
a universal wheel support, where the universal wheel support is connected to the rotating shaft support and is rotatable relative to the rotating shaft support, where
the universal wheel support is provided with a through hole, and the through hole is used for a mounting tool to pass through to fix the rotating shaft support to the predetermined mounting position.

Optionally, the rotating shaft support is provided with a mounting hole, and the through hole is used for the mounting tool to pass through to operate a connecting part passing through the mounting hole, thereby fixing the rotating shaft support to the predetermined mounting position.

Optionally, a distance between a center line of the mounting hole and a rotation axis of the rotating shaft is equal to a distance between a center line of the through hole and the rotation axis of the rotating shaft.

Optionally, a diameter of the through hole is larger than a diameter of the mounting hole.

Optionally, the rotating shaft support is provided with a mounting plate on a plane on which the universal wheel support rotates, and the mounting hole is arranged on the mounting plate.

Optionally, there are at least two mounting holes.

Optionally, a rotating shaft and a universal wheel are mounted on the universal wheel support, the universal wheel is detachably connected to the universal wheel support, and the rotating shaft is connected to the universal wheel support and the rotating shaft support, and is rotatable relative to the rotating shaft support.

Optionally, the rotating shaft and the rotating shaft support are coaxially arranged.

Optionally, the rotating shaft is made of metal material, and the rotating shaft and the universal wheel support are integrally injection molded.

Optionally, the rotating shaft support is provided with an elastic buckle, the elastic buckle is squeezed to a deformed position when the rotating shaft is inserted into the rotating shaft support, and the elastic buckle is reset to an initial position by means of elastic force when the rotating shaft is inserted in place, to restrict movement of the rotating shaft toward the universal wheel support.

Optionally, the elastic buckle includes a hook portion, the rotating shaft includes a stopper recess, and the hook portion cooperates with the stopper recess to restrict movement of the rotating shaft toward the universal wheel support.

An embodiment of the present application provides a smart cleaning device, including the universal wheel assembly described in any one of the foregoing embodiments, where the universal wheel assembly is arranged at the bottom of the smart cleaning device.

Optionally, stopper ribs are evenly arranged on the rotating shaft support around a center line of the rotating shaft support in a circumferential direction, and the stopper ribs match the bottom of the smart cleaning device.

An embodiment of the present application provides a universal wheel assembly, including:
a universal wheel support;
a universal wheel detachably mounted on the universal wheel support; and
a rotating shaft support, where the rotating shaft support is configured to connect to a rotating shaft, so that the universal wheel assembly is rotatable around the rotating shaft, where
the universal wheel support and the rotating shaft support are detachably connected.

Optionally, the universal wheel support is provided with a connecting through hole, and the universal wheel support is connected to the rotating shaft support through the connecting through hole by using a first threaded fastener.

Optionally, the rotating shaft support includes a rotating shaft mounting part, and a rotating shaft supporting part that is sleeved on the rotating shaft mounting part and that is configured to support the rotating shaft mounting part. The rotating shaft mounting part has a first end for tightly fitting with the rotating shaft and a second end opposite to the first end. The second end is used for the first threaded fastener to extend in, so that the universal wheel support is connected to the rotating shaft mounting part in a threaded manner.

Optionally, an internally threaded nut is arranged in the rotating shaft mounting part, and the first threaded fastener is engaged with the internally threaded nut in a threaded manner.

Optionally, the second end protrudes from the rotating shaft supporting part.

Optionally, the second end is accommodated in the connecting through hole so that the universal wheel support abuts against the rotating shaft supporting part.

Optionally, a stopper portion is arranged in an inner cavity of the connecting through hole, and the second end abuts against the stopper portion.

Optionally, one end of the rotating shaft supporting part close to the universal wheel support is provided with a positioning plate on a plane perpendicular to an axis of the rotating shaft, the positioning plate is provided with a positioning hole, and the positioning hole is used for a second threaded fastener to pass through so that the rotating shaft supporting part is positioned to support the rotating shaft mounting part.

Optionally, the positioning plate and the rotating shaft supporting part are integrally formed.

Optionally, the positioning plate has a centrally symmetrical shape, and the positioning holes are symmetrically arranged with respect to the center of the positioning plate.

An embodiment of the present application provides a smart cleaning device, including the universal wheel assembly described in any one of the foregoing embodiments, where the universal wheel assembly is arranged at the bottom of the smart cleaning device.

An embodiment of the present application provides a universal wheel assembly, including:
  a universal wheel support: and
  a universal wheel, where a universal wheel shaft is arranged in the universal wheel, the universal wheel shaft is non-rotatably arranged on the universal wheel support so that the universal wheel is accommodated in the universal wheel support and is rotatable around the universal wheel shaft, the universal wheel shaft is provided with a first blocking part and a second blocking part, and the first blocking part and the second blocking part are respectively located on two opposite sides of the universal wheel, where
  the first blocking part is integrally formed with the universal wheel shaft, and the second blocking part is detachably connected to the universal wheel shaft.

Optionally, a first accommodation portion and a second accommodation portion are formed respectively by inwardly recessing shaft end faces at both ends of the universal wheel, the first blocking part is located in the first accommodation portion, and the second blocking part is located in the second accommodation portion.

Optionally, the first blocking part and the universal wheel shaft are integrally made of plastic material.

Optionally, the universal wheel support is provided with a first positioning recess and a second positioning recess, a first end portion of the universal wheel shaft protruding from the first blocking part is clamped and fixed in the first positioning recess, and a second end portion of the universal wheel shaft protruding from the second blocking part is clamped and fixed in the second positioning recess.

Optionally, the second end portion has a rib arranged in an axial direction, the second blocking part is provided with a groove matching the rib, and the rib cooperates with the groove to restrict relative movement between the second blocking part and the universal wheel shaft.

Optionally, an inner surface of the first positioning recess is provided with a first protrusion, an inner surface of the second positioning recess is provided with a second protrusion, the first end portion is provided with a first hook, the second end portion is provided with a second hook, the first hook clamps the first protrusion, and the second hook clamps the second protrusion.

Optionally, both the first hook and the second hook are elastic, the first end portion is provided with a first relief portion for the first hook to make its way toward the first relief portion when the first hook clamps and abuts against the first protrusion, and the second end portion is provided with a second relief portion for the second hook to make its way toward the second relief portion when the second hook clamps and abuts against the second protrusion.

Optionally, the first end portion has a mounting portion integrally protruding toward a disassembly direction of the universal wheel, and there is an avoidance gap between the mounting portion and the inner surface of the first positioning recess along the axial direction of the universal wheel shaft.

Optionally, the mounting portion protrudes on a radial plane of the universal wheel shaft.

An embodiment of the present application provides a smart cleaning device, including the universal wheel assembly described in any one of the foregoing embodiments.

An embodiment of the present application provides a universal wheel assembly, including:
  a universal wheel support: and
  a universal wheel, where a universal wheel shaft is arranged in the universal wheel, the universal wheel shaft is non-rotatably arranged on the universal wheel support so that the universal wheel is accommodated in the universal wheel support and is rotatable around the universal wheel shaft, both ends of the universal wheel shaft are non-rotatably provided with end cap shafts, the end cap shafts include end cap bodies, and the end cap bodies are respectively located on two opposite sides of the universal wheel, where
  each of the end cap bodies has a first blocking part, a second blocking part, and a third blocking part between the first blocking part and the second blocking part arranged in an axial direction, and a radial height of the third blocking part is different from a radial height of the first blocking part and a radial height of the second blocking part.

Optionally, accommodation portions are formed respectively by inwardly recessing shaft end faces at both ends of the universal wheel, and the end cap bodies are respectively located in the accommodation portions.

Optionally, the first blocking part is closer to the universal wheel than the second blocking part: the radial height of the first blocking part, the radial height of the third blocking part, and the radial height of the second blocking part decrease or increase sequentially.

Optionally, the radial height of the third blocking part is greater than the radial height of the first blocking part and the radial height of the second blocking part, the third blocking part includes a first surface facing the accommodation portion and a second surface opposite to the first surface, the first blocking part is a first annular rib protruding from the first surface, and the second blocking part is a second annular rib protruding from the second surface.

Optionally, the first blocking part and the second blocking part are symmetrically arranged with respect to the third blocking part.

Optionally, both the first annular rib and the second annular rib are in a circular ring shape.

Optionally, the accommodation portion has a proximal surface that is closest to the first surface in the axial direction, and a length of the first annular rib protruding in the axial direction is greater than an axial distance from the first surface to the proximal surface.

Optionally, the universal wheel shaft includes a middle portion and a first end portion and a second end portion extending from the middle portion to both ends, the first end portion and the second end portion are both provided with an axial tangent plane, and a shaft hole of the end cap shaft is provided with an abutment plane that abuts against the axial tangent plane, so that when the end cap shafts are respectively sleeved on the first end portion and the second end portion, they abut against the middle portion and restrict relative movement between the end cap shaft and the universal wheel shaft.

Optionally, the universal wheel shaft is in clearance fit with the universal wheel, and a fitting gap between the end cap shaft and the universal wheel is smaller than a fitting gap between the middle portion and the universal wheel.

Optionally, the fitting gap between the middle portion and the universal wheel is 0.3 mm to 0.4 mm.

Optionally, on the universal wheel shaft, an elastic element is arranged between the end cap shafts, and the universal wheel assembly is constructed as follows: when the end cap shafts receive external force at the same time so that the end cap body abuts against the accommodation portion, the elastic element is in a compressed state; when the external force is removed, the elastic element returns to a natural state from the compressed state so that the end cap shaft is disassembled from the universal wheel shaft.

An embodiment of the present application provides a smart cleaning device, including the universal wheel assembly described in any one of the foregoing embodiments.

DESCRIPTION OF EMBODIMENTS

The following describes numerous specific details to provide a more thorough understanding of the present application. In other examples, to avoid confusion with the present application, some technical features well known in the art are not described.

To fully understand the present application, the following description provides a detailed structure to illustrate the present application. Clearly, the implementation of the present application is not limited to the specific details well known to a person skilled in the art. The following describes some embodiments of the present application in detail. However, in addition to these detailed descriptions, the present application may have other embodiments, and should not be construed as being limited to the embodiments provided herein.

It should be understood that the terms used herein are intended only to describe specific embodiments, and are not intended to limit the present application. The singular forms of "a/an," "one," and "the" are also intended to include plural forms, unless the context clearly indicates another manner. The terms "include" and/or "comprise" used in this specification specify presence of the features, entireties, steps, operations, elements and/or components, but do not exclude presence or addition of one or more of other features, entireties, steps, operations, elements, components, and/or a combination thereof. The terms "upper," "lower," "right" and similar expressions used in the present application are merely intended for illustrative purposes, and are not intended to impose a limitation.

The ordinal numbers such as "first" and "second" cited in the present application are merely identifiers and do not have any other meaning, such as a particular order. Moreover, for example, the term "first end" does not imply existence of "second end" and the term "second end" does not imply existence of "first end."

The following describes in more detail the specific embodiments of the present application with reference to the accompanying drawings. These accompanying drawings illustrate some embodiments of the present application and are not intended to limit the present application.

Figure 1:
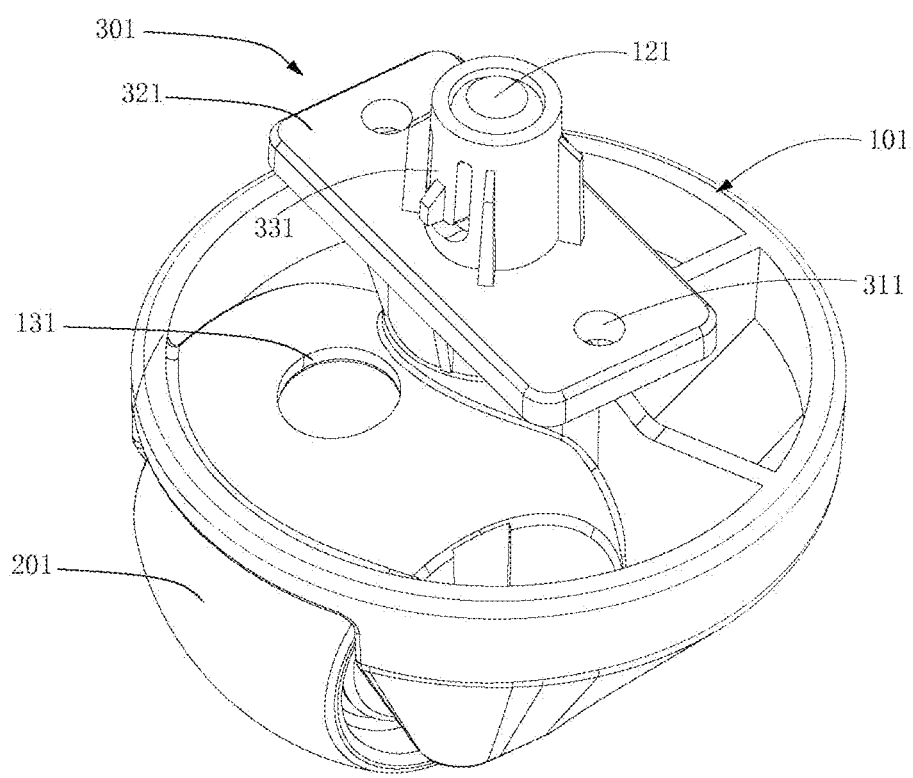
FIG. 1 is a three-dimensional diagram of a universal wheel assembly according to an embodiment of the present application.
Figure 2:
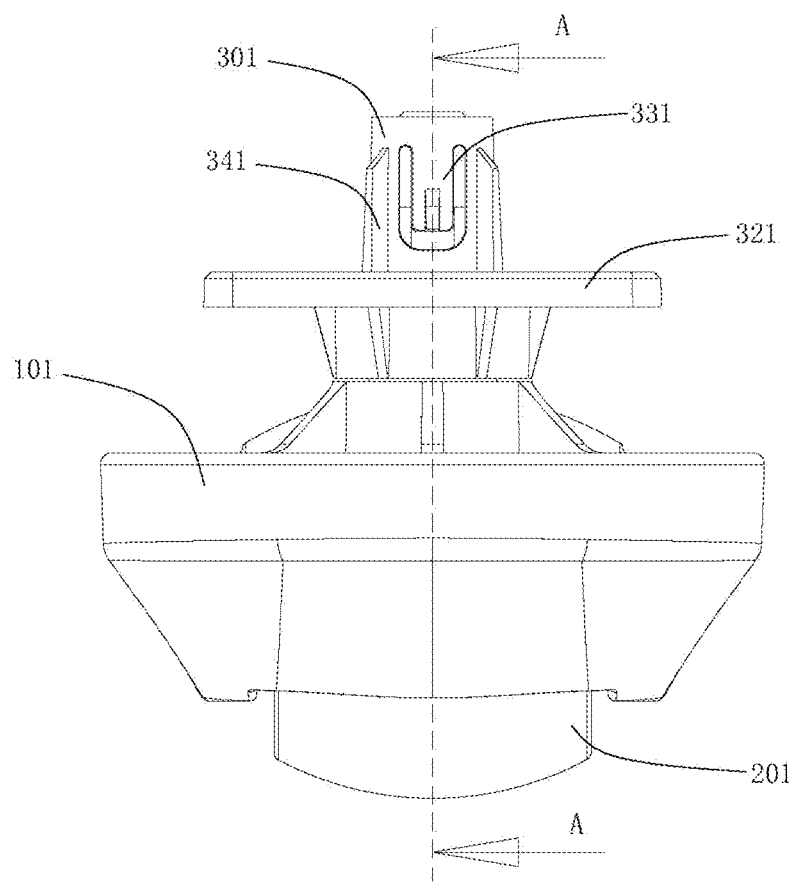
FIG. 2 is a main view of a universal wheel assembly according to an embodiment of the present application.
Figure 3:
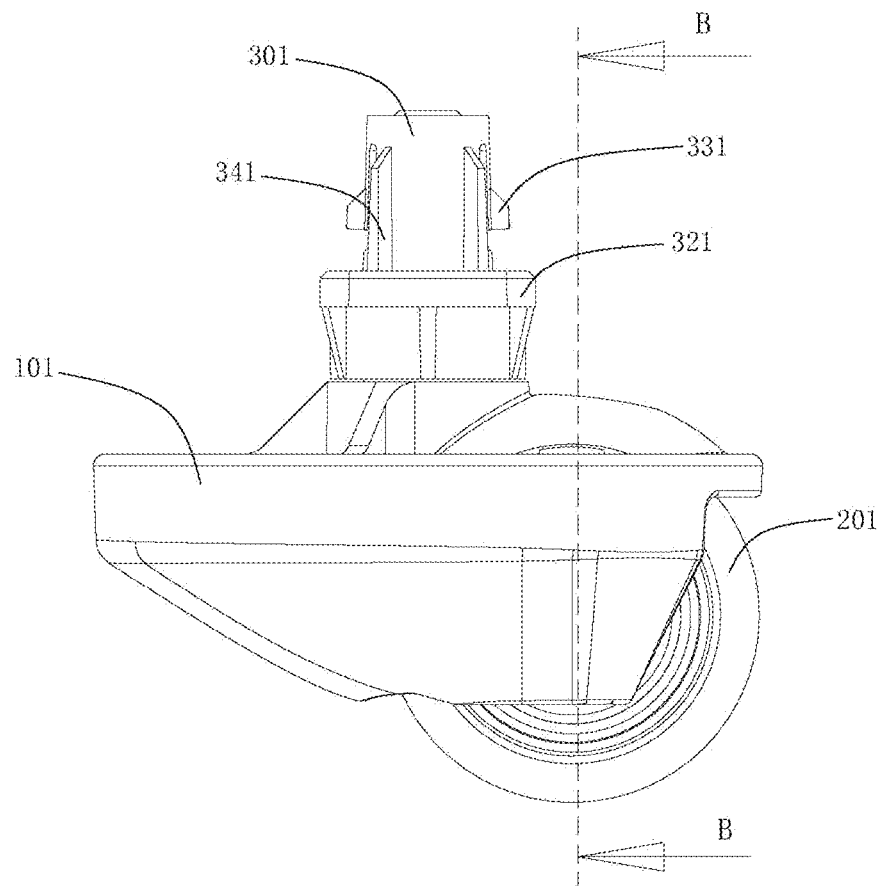
FIG. 3 is a right view of a universal wheel assembly shown in FIG. 2.

FIG. 1 is a three-dimensional diagram of a universal wheel assembly according to an embodiment of the present application.

As shown in FIG. 1, the universal wheel assembly includes a universal wheel support 101 and a rotating shaft support 301. Generally, the universal wheel assembly further includes a universal wheel 201 and a rotating shaft 121.

The rotating shaft support 301 is configured to be fixed to a predetermined mounting position. It should be noted that the predetermined mounting position mentioned here may be located on an intelligent cleaning device, or may be located on any other device that has a function of moving, such as luggage, a movable door, etc.

The universal wheel support 101 is connected to the rotating shaft support 301 and is rotatable relative to the rotating shaft support 301. The universal wheel support 101 is provided with a through hole 131, and the through hole 131 is used for a mounting tool (not shown in the figure) to pass through to fix the rotating shaft support 301 to the predetermined mounting position. In this way, the universal wheel assembly can be easily mounted and disassembled in a narrow space, which facilitates cleaning, repairing, or replacing the universal wheel assembly.

Figure 5:
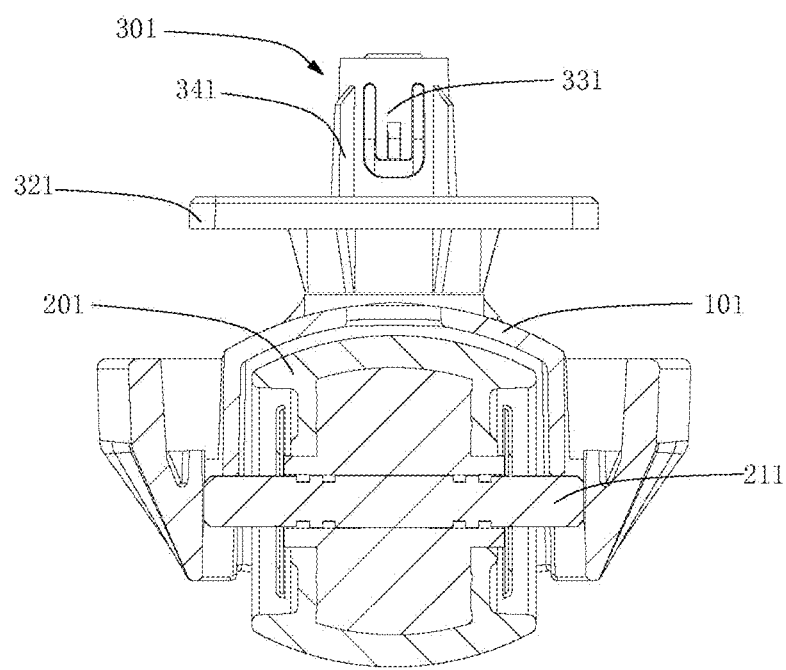
FIG. 5 is a cross-sectional view taken along a B-B line in FIG. 3.

The universal wheel 201 is detachably mounted on the universal wheel support 101. Generally, the universal wheel 201 is provided with a universal wheel shaft 211 (refer to FIG. 5), the universal wheel shaft 211 is non-rotatably arranged on the universal wheel support 101, and the universal wheel 201 is rotatable around the universal wheel shaft 211.

The rotating shaft 121 may be configured to connect the universal wheel support 101 and the rotating shaft support 301, and is rotatable relative to the rotating shaft support 301. The rotating shaft and the rotating shaft support may be coaxially arranged. In addition, the rotating shaft 121 may be fixedly connected to the universal wheel support 101. In this case, the rotating shaft 121 may rotate together with the universal wheel support 101. Thus, the universal wheel 201 is rotatable around the universal wheel shaft 211 and the universal wheel support 101 is rotatable relative to the rotating shaft support 301, so that a universal rotation function of the universal wheel assembly is implemented. Certainly, when the universal wheel assembly is a fully driven wheel, the rotating shaft 121 may alternatively be movably connected to the universal wheel support 101. Even if the rotating shaft 121 is movable relative to the universal wheel support 101, the universal rotation function of the universal wheel assembly is still not affected.

Optionally, the rotating shaft support 301 is provided with a mounting hole 311, and the through hole 131 is used for the mounting tool to pass through to operate a connecting part passing through the mounting hole 311, thereby fixing the rotating shaft support 301 to the predetermined mounting position.

Still referring to FIG. 1, the rotating shaft support 301 may be provided with a mounting plate 321 on a plane perpendicular to an axis of the rotating shaft 121 (it can be understood as on the plane where the universal wheel support 101 rotates). The mounting plate 321 may be integrally formed with the rotating shaft support 301. The mounting plate 321 may have a centrosymmetric shape (rectangular, circular, etc.). The mounting hole 311 is arranged on the mounting plate 321. In this embodiment, the two mounting holes 311 are symmetrically arranged with respect to the center of the mounting plate 321. When the rotating shaft 121 drives the universal wheel support 101 to rotate, the through holes 131 may be respectively located under the mounting holes 311 for the mounting tool to pass through to fix the connecting parts that pass through the mounting holes 311, thereby fixing the rotating shaft support 301 to the predetermined mounting position. It should be noted that "under" mentioned here means that projections of the through hole 131 and the mounting hole 311 on the plane perpendicular to the rotation axis of the rotating shaft 121 at least partially overlap, which ensures that the mounting tool is able to mount the connecting part. In other embodiments, more than two mounting holes 311, such as three or four mounting holes 311, may alternatively be arranged on the mounting plate 321, provided that the through holes 131 allow the mounting tool to pass through to fix the connecting part passing through each mounting hole 311.

To more accurately fix the rotating shaft support 301 to the predetermined mounting position, it may be set that a distance between a center line of the mounting hole 311 and a rotation axis of the rotating shaft 121 is equal to a distance between a center line of the through hole 131 and the axis of the rotating shaft 121. It should be noted that, as mentioned here, the two distances are equal, which means that the shortest distance (which may also be referred to as a vertical distance) between the center line of the mounting hole 311 and the axis of the rotating shaft 121 is equal to the shortest distance (which may also be referred to as a vertical distance) between the center line of the through hole 131 and the axis of the rotating shaft 121. Therefore, when the rotating shaft 121 drives the universal wheel support 101 to rotate, there is a moment at which the through hole 131 is located exactly under the mounting hole 311, that is, the through hole 131 is aligned with the mounting hole 311. At this time, the center line of the through hole 131 coincides with the center line of the mounting hole 311.

Optionally, to help the mounting tool pass through the through hole 131 smoothly and perform mounting or disassembly operations, a diameter of the through hole 131 may be larger than a diameter of the mounting hole 311. In other words, a projection of the through hole 131 on a plane perpendicular to the axis of the rotating shaft 121 may completely cover a projection of the mounting hole 311 on the plane. Therefore, it is more convenient for the mounting tool (such as a screwdriver) to pass through the through hole 131 to accurately position a connecting part (for example, a threaded fastener such as a screw).

With reference to FIG. 2 through FIG. 5, the following describes in detail a specific mounting structure between the rotating shaft 121 and the rotating shaft support 301. The rotating shaft 121 may be made of metal material, and the rotating shaft 121 and the universal wheel support 101 are integrally injection molded. This structure not only can prevent impurities such as dust particles from entering between the rotating shaft 121 and the universal wheel support 101, but also can avoid wear of the rotating shaft 121 and the universal wheel support 101 caused by the universal wheel assembly in a working process. For example, the rotating shaft 121 may have the following structure: the rotating shaft 121 may include a first end 1211 fixed to the universal wheel support 101, a second end 1221 opposite to the first end 1211, and a middle portion 1231 connecting the first end 1211 and the second end 1221. The diameter of the middle portion 1231 is smaller than the diameter of the first end 1211 and the diameter of the second end 1221.

The rotating shaft support 301 is provided with an elastic buckle 331. The elastic buckle 331 may be a portion separated from an opening of a side wall of the rotating shaft support 301. When the rotating shaft 121 is inserted into the rotating shaft support 301, a second end 1221 of the rotating shaft 121 squeezes the elastic buckle 331 to a deformed position (in this embodiment, referring to FIG. 4 and FIG. 5, a bottom end of the elastic buckle 331 may be deformed radially outward). The elastic buckle 331 is reset to an initial position (a position shown in FIG. 4) by means of elastic force when the rotating shaft 121 is inserted in place, to restrict movement of the rotating shaft 121 toward the universal wheel support 101, thereby preventing the universal wheel support 101 from being detached from the rotating shaft support 301. It should be noted that the rotating shaft 121 is in clearance fit with the rotating shaft support 301 after being inserted in place, so that the rotating shaft 121 is rotatable relative to the rotating shaft support 301.

Figure 4:
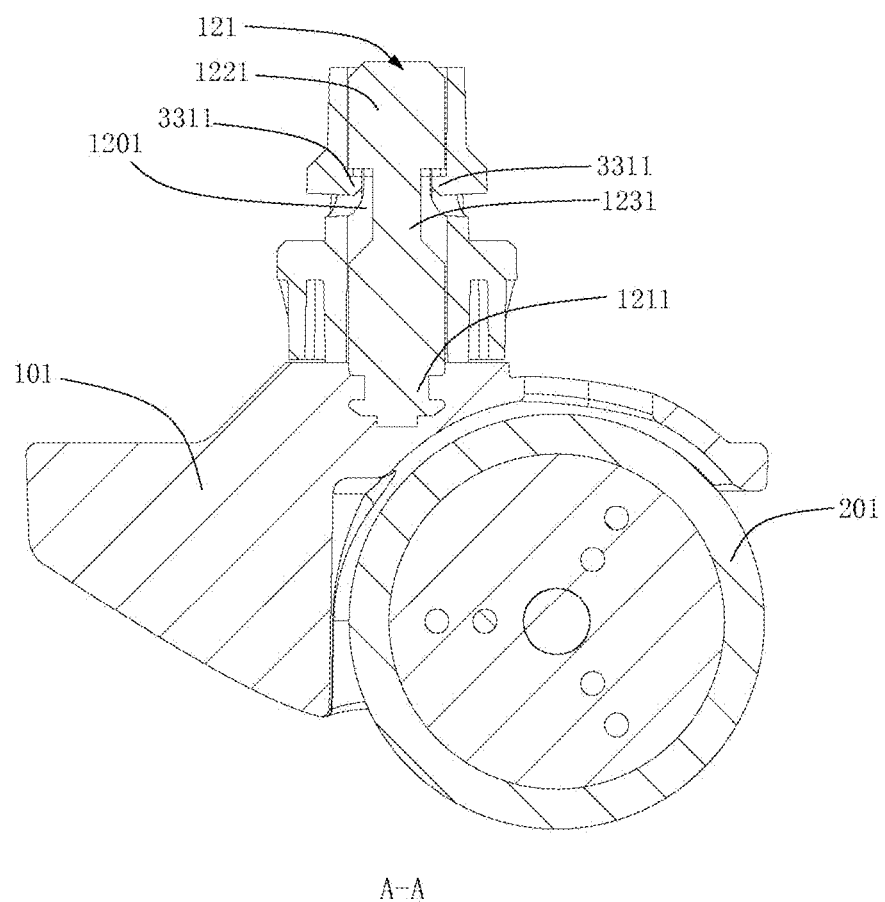
FIG. 4 is a cross-sectional view taken along an A-A line in FIG. 2.

Specifically, the elastic buckle 331 may include a hook portion 3311, the rotating shaft 121 may include a stopper recess 1201, and the hook portion 3311 cooperates with the stopper recess 1201 to restrict movement of the rotating shaft 121 toward the universal wheel support 101. As shown in FIG. 4, the stopper recess 1201 is located between the first end 1211 and the second end 1221.

According to the universal wheel assembly provided in the embodiments of the present application, the universal wheel support is provided with a through hole, and the through hole is used for a mounting tool to pass through to fix the rotating shaft support to a predetermined mounting position. In this way, the universal wheel assembly can be easily mounted and disassembled in a narrow space, which facilitates cleaning, repairing, or replacing the universal wheel assembly. The universal wheel assembly in the embodiments of the present application is not limited to use only on an intelligent cleaning device, but can also be used on any other device that has a function of moving, such as luggage, a movable door, etc.

An embodiment of the present application further provides an intelligent cleaning device, which may be an intelligent sweeping machine, an intelligent mopping machine, etc. The intelligent cleaning device includes a device body, and the device body generally has an approximately circular shape or may have other shapes. The universal wheel assembly is usually mounted at the bottom of the device body of the intelligent cleaning device to support the intelligent cleaning device. In this embodiment of the present application, stopper ribs 341 may alternatively be evenly arranged on the rotating shaft support 301 around a center line of the rotating shaft support 301 in a circumferential direction. Correspondingly, similar grooves may be arranged at the bottom of the intelligent cleaning device, so that the stopper ribs 341 match the grooves at the bottom of the device body to perform a stopping function.

In an embodiment of the present application, the steps of mounting the universal wheel assembly provided in the foregoing embodiments to the intelligent cleaning device are briefly described.

First, connect, through the elastic buckle 331, the rotating shaft support 301 and the rotating shaft 121 fixed to the universal wheel support 101, where the rotating shaft 121 is rotatable relative to the rotating shaft support 301: then, match the stopper rib 341 on the rotating shaft support 301 with the groove at the bottom of the device body to initially fix the universal wheel assembly: then, rotate the universal wheel support 101 so that the through hole 131 is aligned to one mounting hole 311, and the mounting tool can pass through the through hole 131 to mount a connecting part through the mounting hole 311 to the device body: then, rotate the universal wheel support 101 again so that the through hole 131 is aligned to another mounting hole 311, and the mounting tool mounts the connecting part to the device body in the same way, thereby fixing the rotating shaft support 301 to the device body. Finally, mount the universal wheel 201 to the universal wheel support 101. In an embodiment of the present application, the mounting tool may be a screwdriver, and the connecting part may be a screw.

Optionally, in the foregoing steps, it is also possible to first match the stopper rib 341 on the rotating shaft support 301 with the groove at the bottom of the device body, and then connect the universal wheel support 101 and the rotating shaft support 301 through the elastic buckle 331. Remaining operation steps are similar to those described above, and details are not described again.

Figure 6:
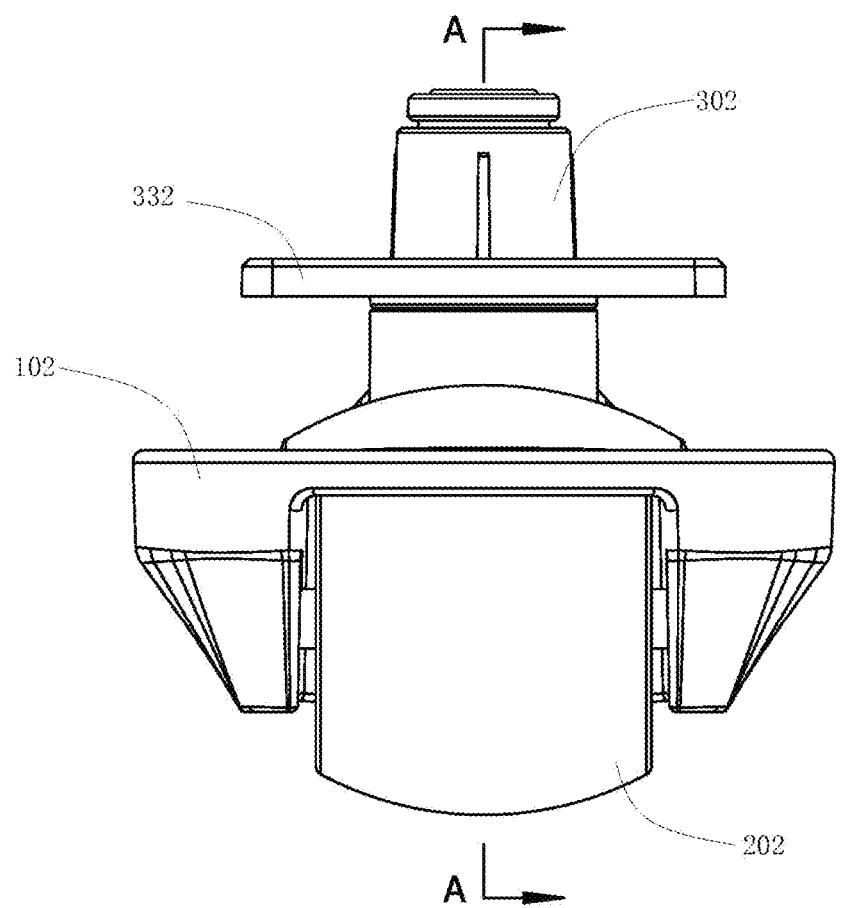
FIG. 6 is a main view of a universal wheel assembly according to an embodiment of the present application.

FIG. 6 is a main view of a universal wheel assembly according to an embodiment of the present application.

As shown in FIG. 6, the universal wheel assembly includes a universal wheel support 102, a universal wheel 202, and a rotating shaft support 302. The universal wheel 202 is detachably mounted on the universal wheel support 102, and the rotating shaft support 302 is configured to connect to a rotating shaft (not shown) so that the universal wheel assembly is rotatable around the rotating shaft. The rotating shaft may be a rotating shaft of the intelligent cleaning device, or a rotating shaft of any other device having a function of moving. Alternatively, the rotating shaft is arranged on the rotating shaft support 302 and connected to the intelligent cleaning device or any other device that has a function of moving, such as luggage, a movable door, etc. The universal wheel support 102 is detachably connected to the rotating shaft support 302. Thus, the universal wheel 202 is detachably mounted on the universal wheel support 102, and the universal wheel support 102 is detachably connected to the rotating shaft support 302. In this way, the universal wheel assembly may be easily disassembled, impurities inside the universal wheel assembly may be removed, and damaged parts in the universal wheel assembly may be repaired or replaced in time.

The detachable connection between the universal wheel support 102 and the rotating shaft support 302 may be (referring to FIG. 7) that the universal wheel support 102 is provided with a connecting through hole 112, and the rotating shaft support 302 is connected to the rotating shaft support 302 through the connecting through hole 112 by using a first threaded fastener 402.

Optionally, the rotating shaft support 302 includes a rotating shaft mounting part 312 and a rotating shaft supporting part 322. Specifically, a first end of the rotating shaft mounting part 312 is configured to tightly fit with the rotating shaft, and a second end opposite to the first end is configured for the first threaded fastener 402 to extend in, so that the universal wheel support 102 is connected to the rotating shaft mounting part 312 in a threaded manner. Therefore, rotation of the rotating shaft can drive the universal wheel assembly to rotate. The rotating shaft supporting part 322 is sleeved on the rotating shaft mounting part 312, and can be connected to the intelligent cleaning device or any other device that has a function of moving, to support the rotating shaft mounting part 312. In addition, the rotating shaft supporting part 322 is in clearance fit with the rotating shaft mounting part 312, so that rotation of the rotating shaft mounting part 312 and the rotating shaft is not affected.

Further, optionally, an internally threaded nut 3112 is arranged in the rotating shaft mounting part 312, and the first threaded fastener 402 is engaged with the internally threaded nut 3112 in a threaded manner, so that the universal wheel support 102 is detachably connected to the rotating shaft support 302 in a threaded manner.

Figure 7:
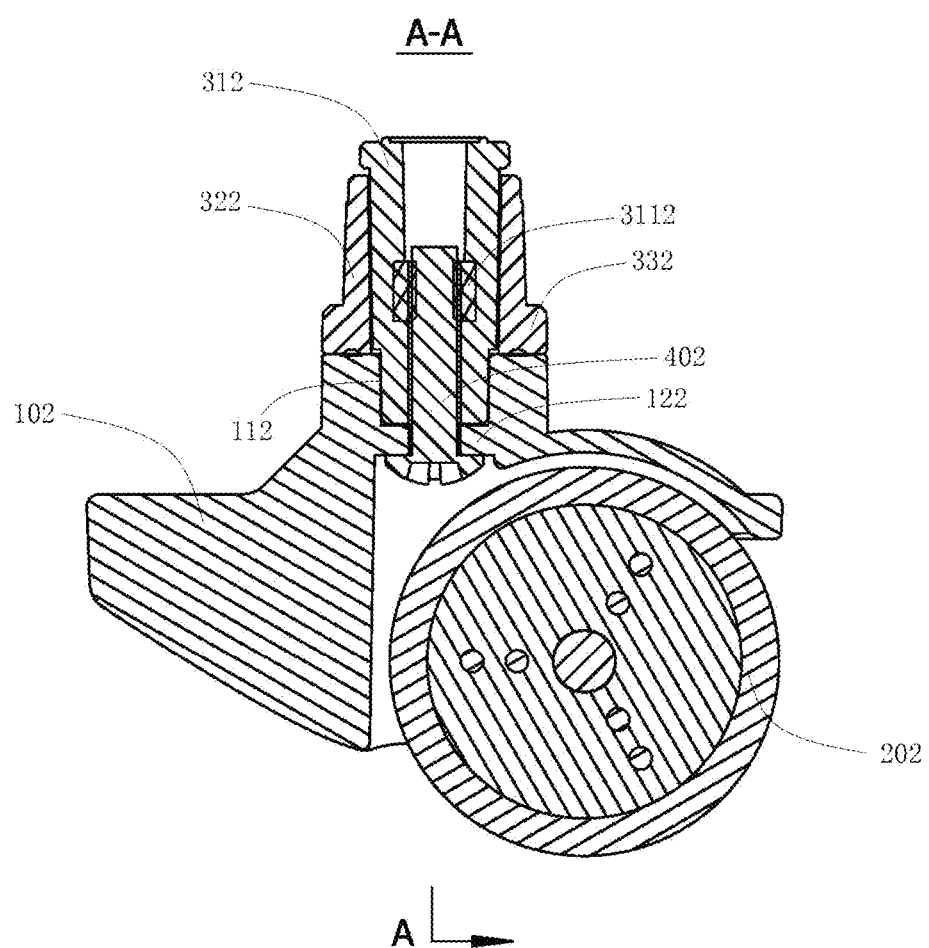
FIG. 7 is a cross-sectional view taken along an A-A line in FIG. 6.

Still referring to FIG. 7, the second end of the rotating shaft mounting part 312 protrudes from the rotating shaft supporting part 322. In this way, the rotating shaft mounting part 312 wraps the first threaded fastener 402 to a greater extent, ensuring stable connection between the first threaded fastener 402 and the rotating shaft mounting part 312.

Further, optionally, the portion of the second end of the rotating shaft mounting part 312 protruding from the rotating shaft supporting part 322 is accommodated in the connecting through hole 112, so that the universal wheel support 102 is against the rotating shaft supporting part 322. This ensures stable and detachable connection between the universal wheel support 102 and the rotating shaft support 302 (shown in FIG. 6).

Further, optionally, an inner cavity of the connecting through hole 112 is provided with a stopper portion 122, and the portion of the second end of the rotating shaft mounting part 312 protruding from the rotating shaft supporting part 322 is against the stopper portion 122. This further ensures stable and detachable connection between the universal wheel support 102 and the rotating shaft support 302 (shown in FIG. 6).

Figure 8:
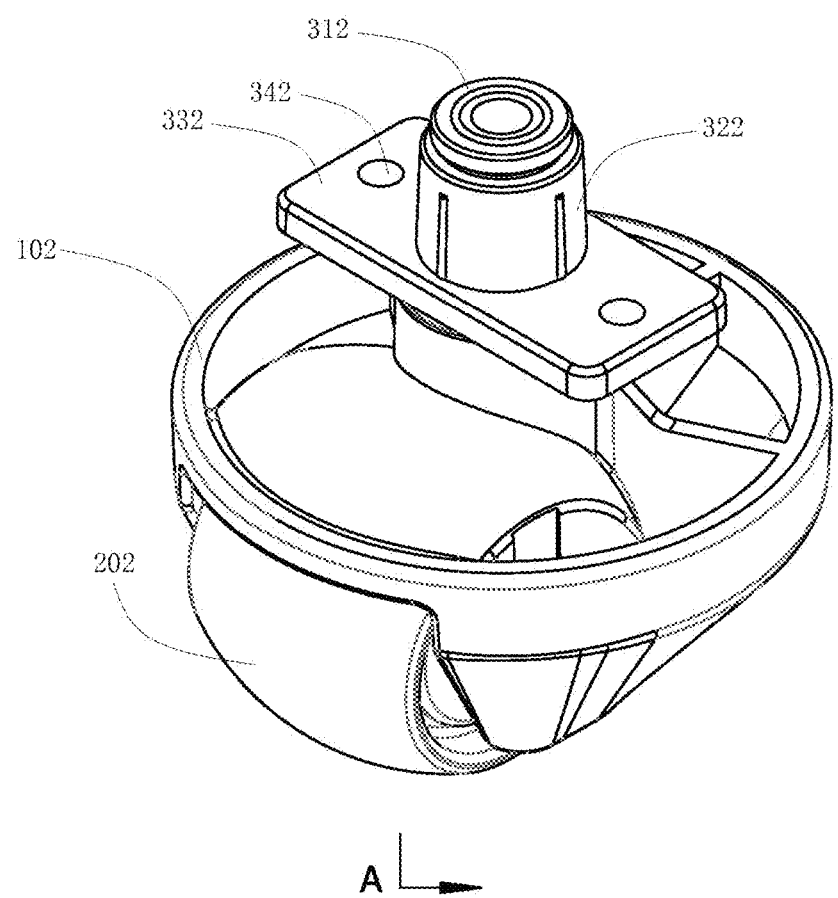
FIG. 8 is a three-dimensional diagram of a universal wheel assembly according to an embodiment of the present application.

As shown in FIG. 8, one end of the rotating shaft supporting part 322 close to the universal wheel support 102 may be provided with a positioning plate 332 perpendicular to an axis of the rotating shaft of the intelligent cleaning device, and the positioning plate 332 is provided with a positioning hole 342. The positioning hole 342 is used for a second threaded fastener (not shown) to pass through, so that the rotating shaft supporting part 322 is connected to the intelligent cleaning device or any other device having a function of moving.

The positioning plate 332 may be integrally formed with the rotating shaft supporting part 322. The positioning plate 332 may have a centrosymmetric shape (rectangular, circular, etc.), and the positioning holes 342 are symmetrically arranged with respect to the center of the positioning plate 332.

Figure 9:
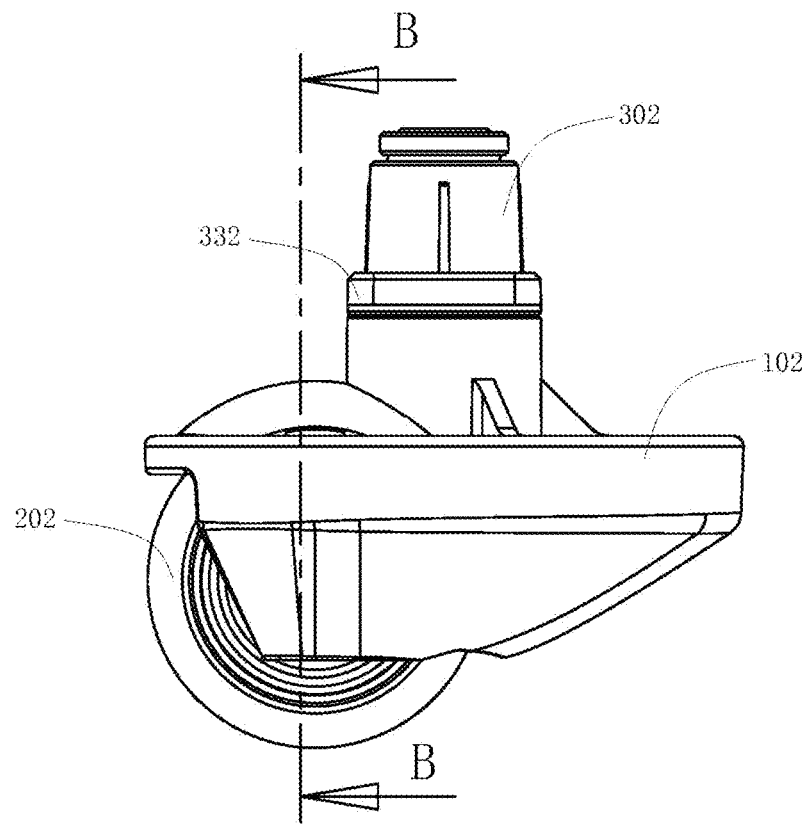
FIG. 9 is a right view of a universal wheel assembly shown in FIG. 6.
Figure 10:
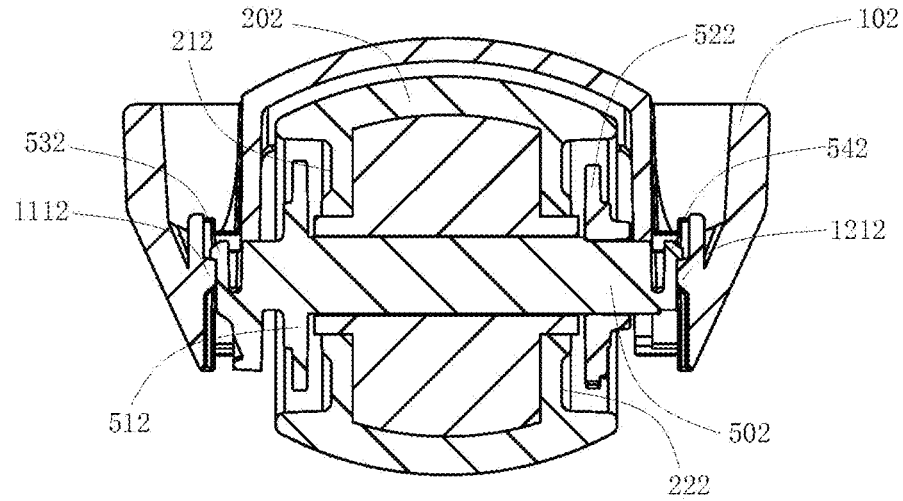
FIG. 10 is a cross-sectional view taken along a B-B line in FIG. 9.

The following describes in detail a specific mounting structure between the universal wheel 202 and the universal wheel support 102. In an embodiment of the present application, as shown in FIG. 9 and FIG. 10, a universal wheel shaft 502 is arranged in the universal wheel 202, and the universal wheel shaft 502 is non-rotatably arranged on the universal wheel support 102, so that the universal wheel 202 is accommodated in the universal wheel support 102 and is rotatable around the universal wheel shaft 502. The universal wheel shaft 502 may be provided with a first blocking part 512 and a second blocking part 522. The first blocking part 512 and the second blocking part 522 are respectively located on two opposite sides of the universal wheel 202. In this way, foreign particles, entanglements, etc. can be prevented from entering between the universal wheel 202 and the universal wheel shaft 502.

Optionally, the first blocking part 512 may be integrally formed with the universal wheel shaft 502, and the second blocking part 522 is detachably connected to the universal wheel shaft 502. In this way, foreign particles, entanglements, etc. are prevented from entering between the universal wheel 202 and the universal wheel shaft 502, thus avoiding generation of harsh and sharp noises. In addition, the mounting process between the universal wheel shaft 502 and the first blocking part 512 may be simplified, and disassembly and assembly of the universal wheel assembly may be simplified.

Further, optionally, the universal wheel shaft 502 and the first blocking part 512 may be integrally made of plastic material. In this way, even if small particles enter between the universal wheel 202 and the universal wheel shaft 502, harsh and sharp noises may still be avoided. In addition, the weight and cost of the universal wheel shaft 502 may be reduced by using the plastic material. The second blocking part 522 may also be made of plastic material.

To make the first blocking part 512 and the second blocking part 522 better at blocking particulate objects or entanglements such as hair and fluff, a first accommodation portion 212 and a second accommodation portion 222 may be formed respectively by inwardly recessing shaft end faces at both ends of the universal wheel 202. The first blocking part 512 is located in the first accommodation portion 212, and the second blocking part 522 is located in the second accommodation portion 222. Therefore, the first blocking part 512 and the second blocking part 522 are wrapped by the first accommodation portion 212 and the second accommodation portion 222. Before entering between the universal wheel 202 and the universal wheel shaft 502, foreign particles have to pass through a passage formed by the first accommodation portion 212 and the first blocking part 512 (a passage formed by the second accommodation portion 222 and the second blocking part 522) (refer to FIG. 10). Clearly, such entry method is not easy.

Figure 12:
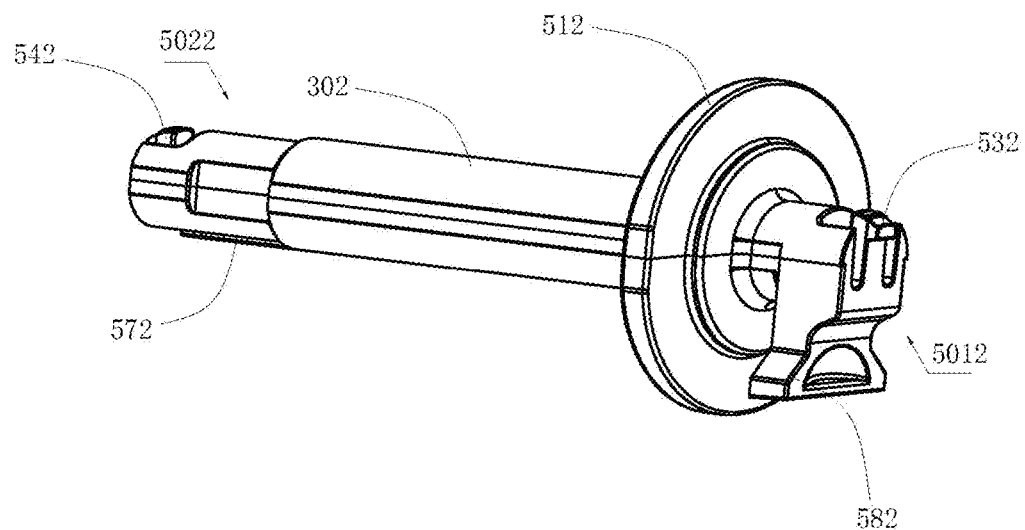
FIG. 12 is a three-dimensional diagram of another perspective of a universal wheel shaft and a first blocking part shown in FIG. 11.
Figure 13:
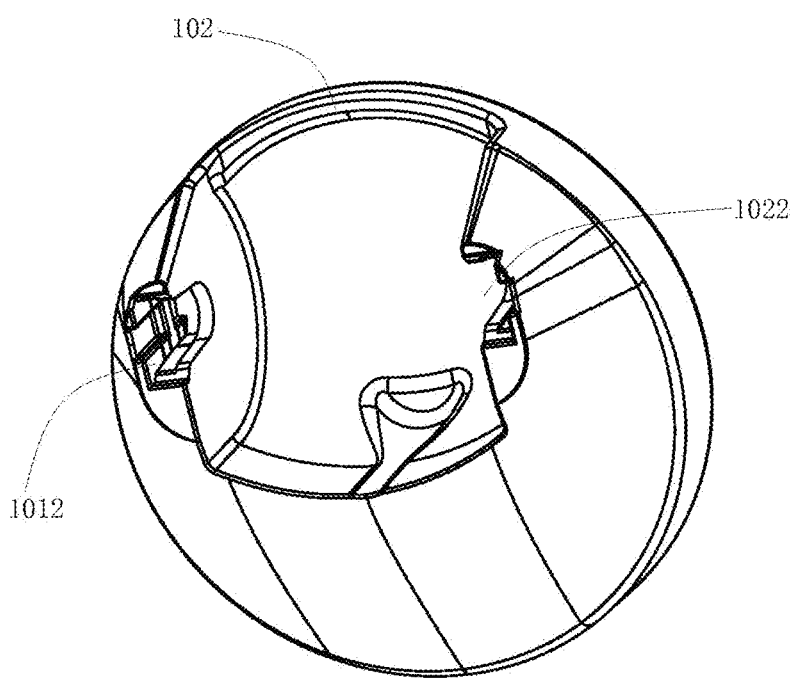
FIG. 13 is a bottom view of a universal wheel support shown in FIG. 10.

In an embodiment of the present application, as shown in FIG. 10, FIG. 12, and FIG. 13, the universal wheel support 102 is provided with a first positioning recess 1012 and a second positioning recess 1022. The first positioning recess 1012 and the second positioning recess 1022 may be symmetrically arranged with respect to the universal wheel support 102 and have the same structure. A first end portion 5012 of a universal wheel shaft 502 protruding from a first blocking part 512 is clamped and fixed in the first positioning recess 1012, and a second end portion 5022 of the universal wheel shaft 502 protruding from a second blocking part 522 is clamped and fixed in the second positioning recess 1022.

Figure 11:
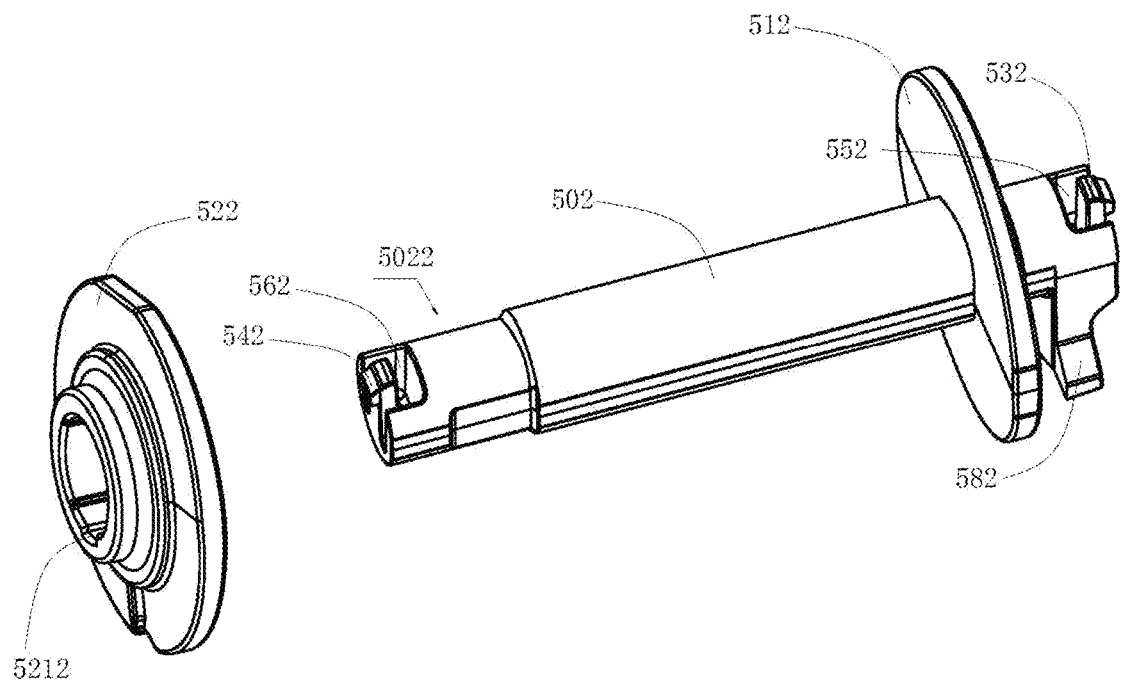
FIG. 11 is a three-dimensional diagram of a universal wheel shaft, a first blocking part, and a second blocking part shown in FIG. 10.

As shown in FIG. 11 and FIG. 12, a rib 572 may be arranged on the second end portion 5022 in an axial direction. Correspondingly, the second blocking part 522 is provided with a groove 5212 that matches the rib 572. The rib 572 cooperates with the groove 5212 to restrict relative movement between the second blocking part 522 and the universal wheel shaft 502. The relative movement means that the second blocking part 522 cannot rotate or translate relative to the universal wheel shaft 502. Therefore, the second blocking part 522 can be stably arranged on the universal wheel shaft 502 to carry out the function of blocking.

Further, for the universal wheel shaft 502 on which the second blocking part 522 is arranged, the universal wheel shaft 502 may be positioned on the universal wheel support 102 (as shown in FIG. 13) as follows: an inner surface of the first positioning recess 1012 is provided with a first protrusion 1112 (as shown in FIG. 10), an inner surface of the second positioning recess 1022 is provided with a second protrusion 1212, the first end portion 5012 is provided with a first hook 532, the second end portion 5022 is provided with a second hook 542, the first hook 532 clamps the first protrusion 1112, and the second hook 542 clamps the second protrusion 1212 (as shown in FIG. 10).

Optionally, both the first hook 532 and the second hook 542 are elastic. In an embodiment of the present application, the universal wheel shaft 502 is made of plastic material, and the first hook 532 and the second hook 542 respectively arranged on the first end portion 5012 and the second end portion 5022 have the property of elasticity. Correspondingly, as shown in FIG. 11, the first end portion 5012 is provided with a first relief portion 552, and the second end portion 5022 is provided with a second relief portion 562. The first relief portion 552 is used for the first hook 532 to make its way toward the first relief portion 552 when the first hook 532 clamps and abuts against the first protrusion 1112 (as shown in FIG. 10). The second relief portion 562 is used for the second hook 542 to make its way toward the second relief portion 562 when the second hook 542 clamps and abuts against the second protrusion 1212 (as shown in FIG. 10). Thus, the universal wheel shaft 502 can be firmly positioned in the universal wheel support 102.

To facilitate mounting or disassembly of the universal wheel shaft 502 and the universal wheel support 102, the first end portion 5012 may have a mounting portion 582 integrally protruding toward a disassembly direction of the universal wheel 202, and there is an avoidance gap between the mounting portion 582 and the inner surface of the first positioning recess 1012 along the axial direction of the universal wheel shaft 502. Arranging the avoidance gap enables the first end portion 5012 to enter the first positioning recess 1012 more easily, and to be clamped and fixed in the first positioning recess 1012.

Optionally, the mounting portion 582 may protrude on a radial plane of the universal wheel shaft 502. This simplifies a processing technique and saves mounting space inside the universal wheel support 102.

According to the universal wheel assembly provided in the embodiments of the present application, the universal wheel is detachably mounted on the universal wheel support, and the universal wheel support is detachably connected to the rotating shaft support. In this way, the universal wheel assembly can be easily disassembled, debris inside the universal wheel assembly can be removed, and the damaged parts in the universal wheel assembly can be timely repaired or replaced. The universal wheel assembly in the present application is not limited to use only on an intelligent cleaning device, but can also be used on any other device that needs to have a function of moving, such as luggage, a movable door, etc.

An embodiment of the present application further provides an intelligent cleaning device, which may be an intelligent sweeping device, an intelligent mopping device, etc. The intelligent cleaning device may include a device body, and the device body generally has an approximately circular shape or may have other shapes. The device body includes a lower housing assembly and an upper housing assembly assembled with the lower housing assembly.

In an embodiment of the present application, the steps of mounting the universal wheel assembly provided in the foregoing embodiments to the smart cleaning device are briefly described.

First, mount the rotating shaft mounting part 312 to the lower housing assembly of the intelligent cleaning device, and ensure that the rotating shaft mounting part 312 is connected to the rotating shaft of the intelligent cleaning device, where an internally threaded nut 3112 may be arranged in the rotating shaft mounting part 312 in advance for use: then, sleeve the rotating shaft supporting part 322 on the rotating shaft mounting part 312, so that the rotating shaft supporting part 322 is in clearance fit with the rotating shaft mounting part 312 to support the rotating shaft mounting part 312. The second threaded fastener may pass through the positioning hole 342 of the positioning plate 332 to cooperate with threads in the lower housing assembly to complete the positioning of the rotating shaft supporting part 322. In this case, the positioning plate 332 is exposed on a bottom surface of the lower housing assembly of the intelligent cleaning device. Then, insert a portion of the rotating shaft mounting part 312 protruding from the rotating shaft supporting part 322 into a corresponding connecting through hole 112 of the universal wheel support 102, and when the universal wheel 202 is not mounted on the universal wheel support 102, make the first threaded fastener 402 pass through the connecting through hole 112 to connect to the internally threaded nut 3112 in the rotating shaft mounting part 312 in a threaded manner; finally, detachably connect the universal wheel 202 and the universal wheel support 102. In this case, the universal wheel support 102 protrudes from the smart cleaning device.

Figure 14:
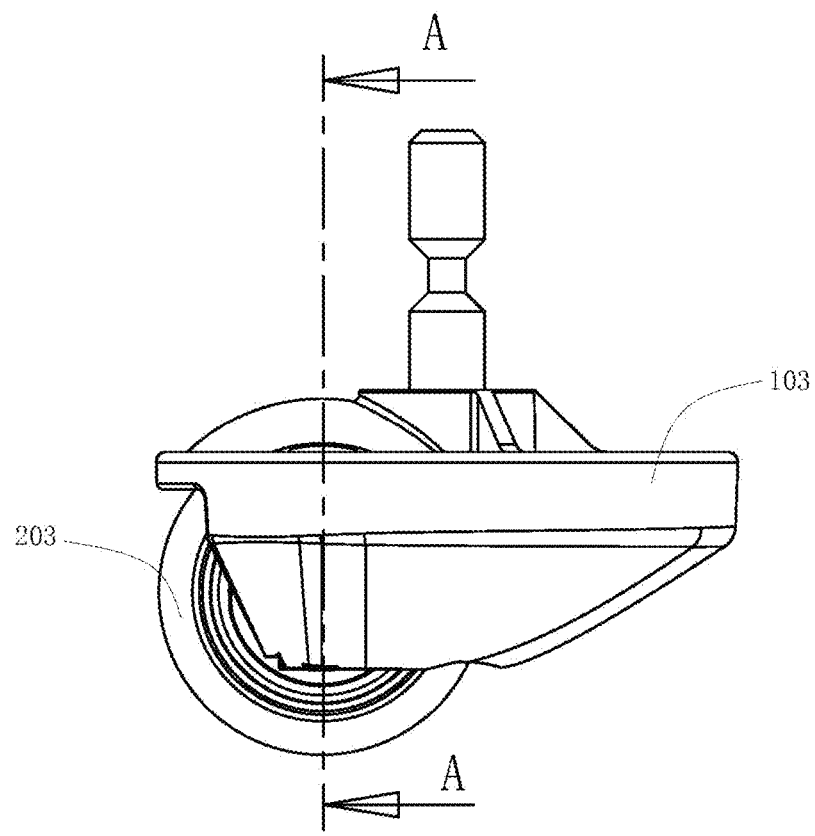
FIG. 14 is a side view of a universal wheel assembly according to an embodiment of the present application.

FIG. 14 is a side view of a universal wheel assembly according to an embodiment of the present application.

Figure 15:
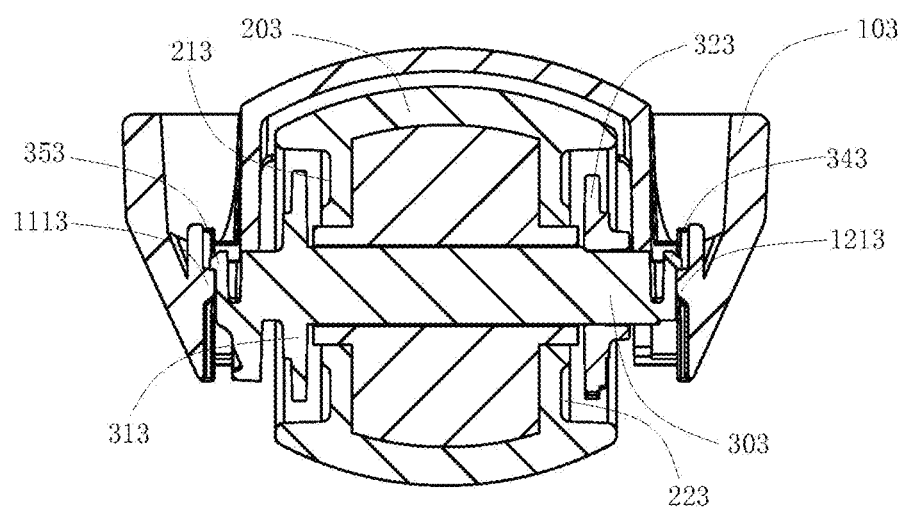
FIG. 15 is a cross-sectional view taken along an A-A line in FIG. 14.

As shown in FIG. 14 and FIG. 15, the universal wheel assembly includes a universal wheel support 103 and a universal wheel 203. A universal wheel shaft 303 is arranged in the universal wheel 203, and the universal wheel shaft 303 is non-rotatably arranged on the universal wheel support 103, so that the universal wheel 203 is accommodated in the universal wheel support 103 and is rotatable around the universal wheel shaft 303. The universal wheel shaft 303 is provided with a first blocking part 313 and a second blocking part 323. The first blocking part 313 and the second blocking part 323 are respectively located on two opposite sides of the universal wheel 203. The first blocking part 313 is integrally formed with the universal wheel shaft 303, and the second blocking part 323 is detachably connected to the universal wheel shaft 303.

The first blocking part 313 and the second blocking part 323 are respectively arranged on the two opposite sides of the universal wheel 203, the first blocking part 313 and the universal wheel shaft 303 are integrally formed, and the second blocking part 323 is detachably connected to the universal wheel shaft 303. In this way, foreign particles, entanglements, etc. can be prevented from entering between the universal wheel 203 and the universal wheel shaft 303, thus avoiding generation of harsh and sharp noises by the universal wheel assembly during movement. In addition, the mounting process between the universal wheel shaft 303 and the first blocking part 313 can be simplified, and simple disassembly and assembly of the universal wheel assembly can be implemented. Such universal wheel assembly can be mounted to an intelligent cleaning device, or can be mounted to any other device that needs to have a function of moving, such as luggage, a movable door, or another smart device.

The universal wheel shaft 303 and the first blocking part 313 may be integrally made of plastic material. In this way, even if small particles enter between the universal wheel 203 and the universal wheel shaft 303, harsh and sharp noises generated by the universal wheel assembly during movement can still be better avoided. In addition, the weight and cost of the universal wheel shaft 303 may be reduced by using the plastic material. The second blocking part 323 may also be made of plastic material.

To make the first blocking part 313 and the second blocking part 323 better block particles or entanglements such as hair and fluff, a first accommodation portion 213 and a second accommodation portion 223 may be formed respectively by inwardly recessing shaft end faces at both ends of the universal wheel 203. The first blocking part 313 is located in the first accommodation portion 213, and the second blocking part 323 is located in the second accommodation portion 223. Therefore, the first blocking part 313 and the second blocking part 323 are wrapped by the first accommodation portion 213 and the second accommodation portion 223. Before entering between the universal wheel 203 and the universal wheel shaft 303, the foreign particles have to pass through a passage formed by the first accommodation portion 213 and the first blocking part 313 (a passage formed by the second accommodation portion 223 and the second blocking part 323) (refer to FIG. 15). Clearly, such entry method is not easy.

The following describes in detail a specific structure of the universal wheel shaft 303 and a relationship between the universal wheel shaft 303 and the universal wheel support 103.

Figure 17:
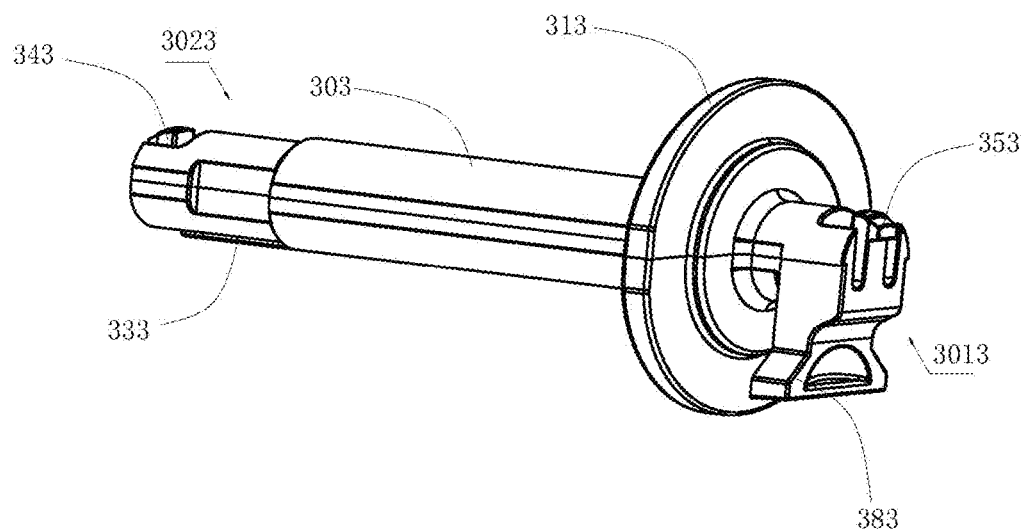
FIG. 17 is a three-dimensional diagram of another perspective of a universal wheel shaft and a first blocking part shown in FIG. 16.
Figure 18:
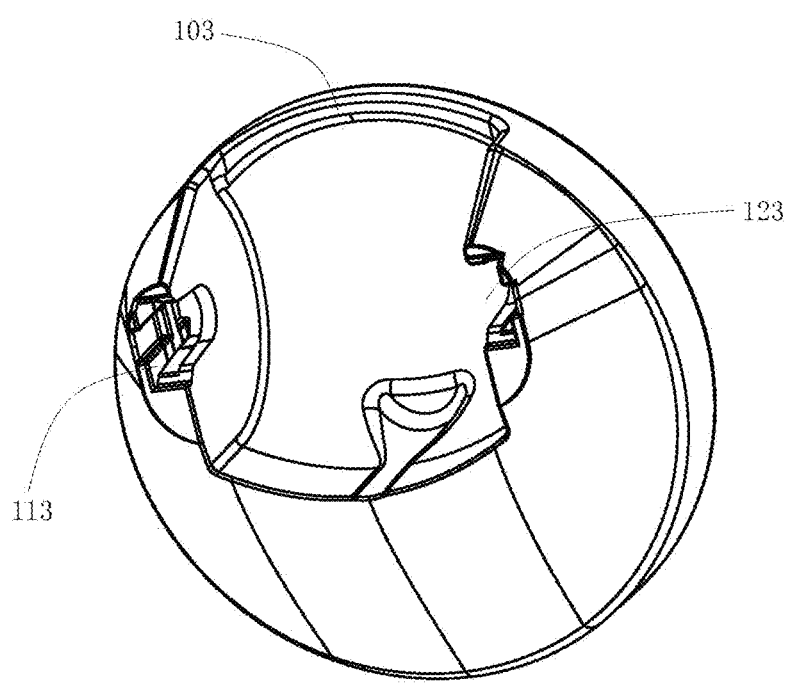
FIG. 18 is a bottom view of a universal wheel support shown in FIG. 15.

In an embodiment of the present application, as shown in FIG. 15, FIG. 17, and FIG. 18, the universal wheel support 103 is provided with a first positioning recess 113 and a second positioning recess 123. The first positioning recess 113 and the second positioning recess 123 may be symmetrically arranged with respect to the universal wheel support 103 and have the same structure. A first end portion 3013 of a universal wheel shaft 303 protruding from a first blocking part 313 is clamped and fixed in the first positioning recess 113, and a second end portion 3023 of the universal wheel shaft 303 protruding from a second blocking part 323 is clamped and fixed in the second positioning recess 123.

Figure 16:
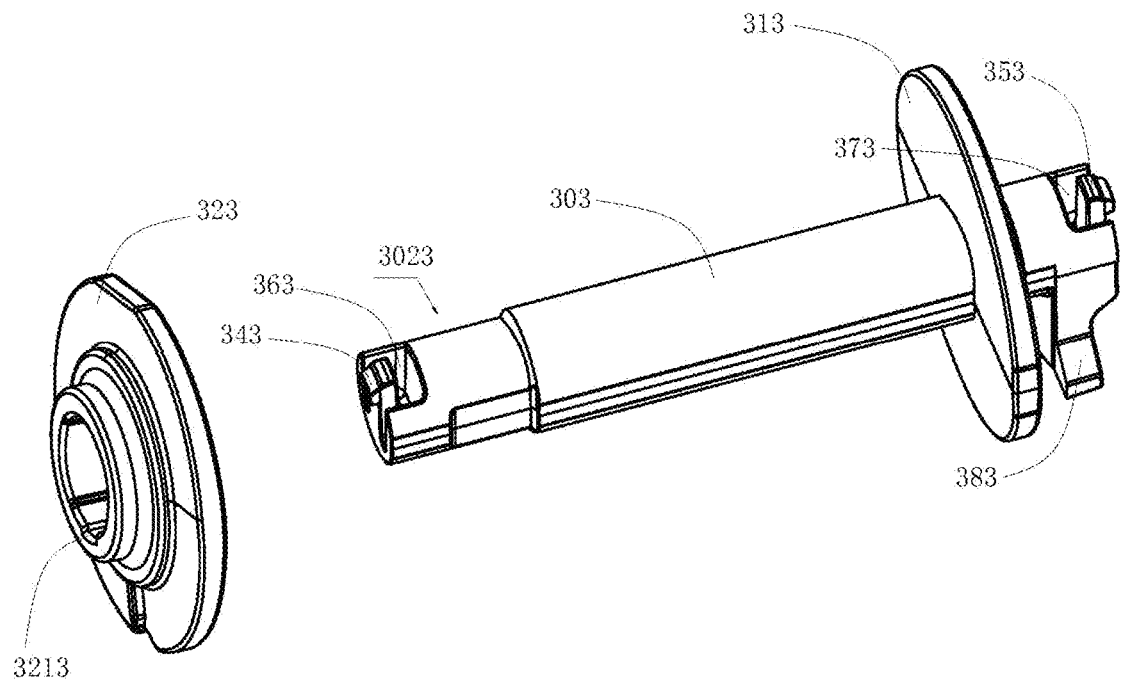
FIG. 16 is a three-dimensional diagram of a universal wheel shaft, a first blocking part, and a second blocking part shown in FIG. 15.

As shown in FIG. 16 and FIG. 17, a rib 333 may be arranged on the second end portion 3023 in an axial direction. Correspondingly, the second blocking part 323 is provided with a groove 3213 that matches the rib 333. The rib 333 cooperates with the groove 3213 to restrict relative movement between the second blocking part 323 and the universal wheel shaft 303. The relative movement means that the second blocking part 323 cannot rotate or translate relative to the universal wheel shaft 303. Therefore, the second blocking part 323 can be stably arranged on the universal wheel shaft 303 to carry out a function of blocking.

Further, for the universal wheel shaft 303 on which the second blocking part 323 is arranged, the universal wheel shaft 303 may be positioned on the universal wheel support 103 as follows: an inner surface of the first positioning recess 113 is provided with a first protrusion 1113 (as shown in FIG. 15), an inner surface of the second positioning recess 123 is provided with a second protrusion 1213, the first end portion 3013 is provided with a first hook 353, the second end portion 3023 is provided with a second hook 343, the first hook 353 clamps the first protrusion 1113 (as shown in FIG. 15), and the second hook 343 clamps the second protrusion 1213.

Optionally, both the first hook 353 and the second hook 343 are elastic. In an embodiment of the present application, the universal wheel shaft 303 is made of plastic material, and the first hook 353 and the second hook 343 respectively arranged on the first end portion 3013 and the second end portion 3023 have the property of elasticity. Correspondingly, as shown in FIG. 16, the first end portion 3013 in FIG. 17 is provided with a first relief portion 373, and the second end portion 3023 is provided with a second relief portion 363. The first relief portion 373 is used for the first hook 353 to make its way toward the first relief portion 373 when the first hook 353 clamps and abuts against the first protrusion 1113 (as shown in FIG. 15). The second relief portion 363 is used for the second hook 343 to make its way toward the second relief portion 363 when the second hook 343 clamps and abuts against the second protrusion 1213 (see FIG. 15). Thus, the universal wheel shaft 303 can be firmly positioned in the universal wheel support 103 (see FIG. 18).

To facilitate mounting or disassembly of the universal wheel shaft 303 and the universal wheel support 103, the first end portion 3013 may have a mounting portion 383 integrally protruding toward a disassembly direction of the universal wheel 203, and there is an avoidance gap between the mounting portion 383 and the inner surface of the first positioning recess 113 along the axial direction of the universal wheel shaft 303. Arranging the avoidance gap enables the first end portion 3013 to enter the first positioning recess 113 more easily, and to be clamped and fixed in the first positioning recess 113.

Optionally, the mounting portion 383 may protrude on a radial plane of the universal wheel shaft 303. This simplifies a processing technique and saves mounting space inside the universal wheel support 103.

According to the universal wheel assembly provided in the embodiments of the present application, the first blocking part and the second blocking part are respectively arranged on two opposite sides of the universal wheel, the first blocking part and the universal wheel shaft are integrally formed, and the second blocking part is detachably connected to the universal wheel shaft. In this way, foreign particles, entanglements, etc. can be prevented from entering between the universal wheel and the universal wheel shaft, thus avoiding generation of harsh and sharp noises by the universal wheel assembly during movement. In addition, the mounting process between the universal wheel shaft and the first blocking part can be simplified, and simple disassembly and assembly of the universal wheel assembly can be implemented. Such universal wheel assembly can be mounted to an intelligent cleaning device, or can be mounted to any other device that needs to have a function of moving, such as luggage, a movable door, or another intelligent device.

An embodiment of the present application further provides an intelligent cleaning device, which may be an intelligent sweeping device, an intelligent mopping device, etc. The intelligent cleaning device includes a device body, and the device body generally has an approximately circular shape or may have other shapes. The device body includes a lower housing assembly and an upper housing assembly assembled with the lower housing assembly.

In an embodiment of the present application, the steps of mounting the universal wheel assembly provided in the foregoing embodiments to the intelligent cleaning device are briefly described.

First, pass the second end portion 3023 of the universal wheel shaft 303 with the first blocking part 313 through the universal wheel 203, and sleeve the universal wheel 203 on the universal wheel shaft 303: then, arrange the second blocking part 323 on the first end portion 3013 of the universal wheel shaft 303; then, make the first hook 353 and the second hook 343 respectively clamp and elastically abut against the first protrusion 1113 (as shown in FIG. 15) and the second protrusion 1213, so that the universal wheel shaft 303 is mounted in the universal wheel support 103: finally, connect the universal wheel support 103 and the intelligent cleaning device.

Figure 19:
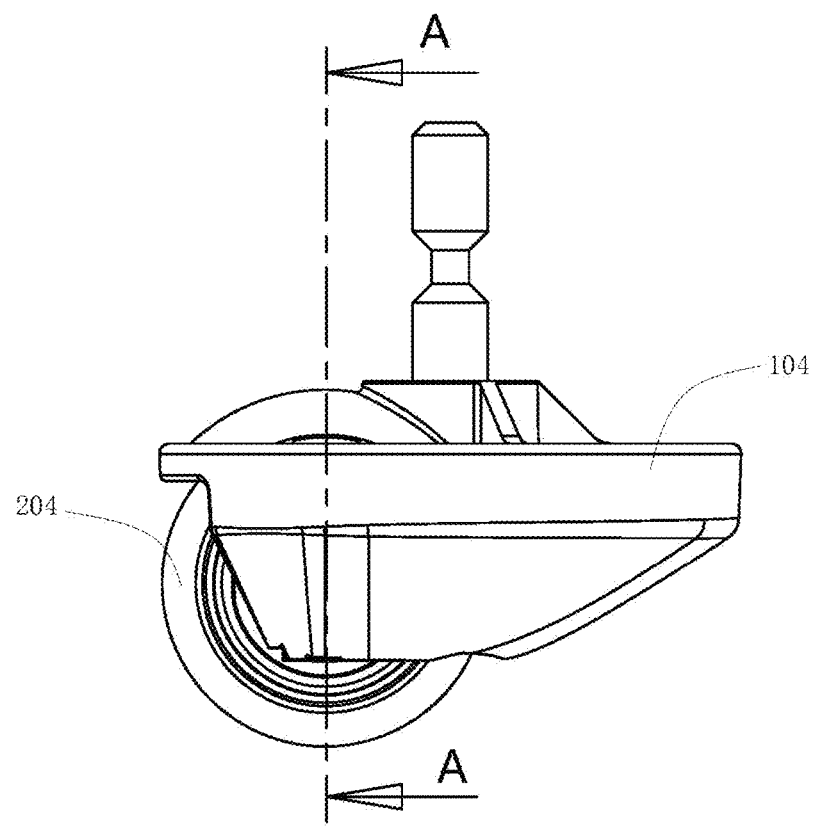
FIG. 19 is a side view of a universal wheel assembly according to an embodiment of the present application.

FIG. 19 is a side view of a universal wheel assembly according to an embodiment of the present application.

As shown in FIG. 19, the universal wheel assembly includes a universal wheel support 104 and a universal wheel 204. A universal wheel shaft 304 (see FIG. 24) is arranged in the universal wheel 204, and the universal wheel shaft 304 is non-rotatably arranged on the universal wheel support 104, so that the universal wheel 204 is accommodated in the universal wheel support 104 and is rotatable around the universal wheel shaft 304.

Figure 20:
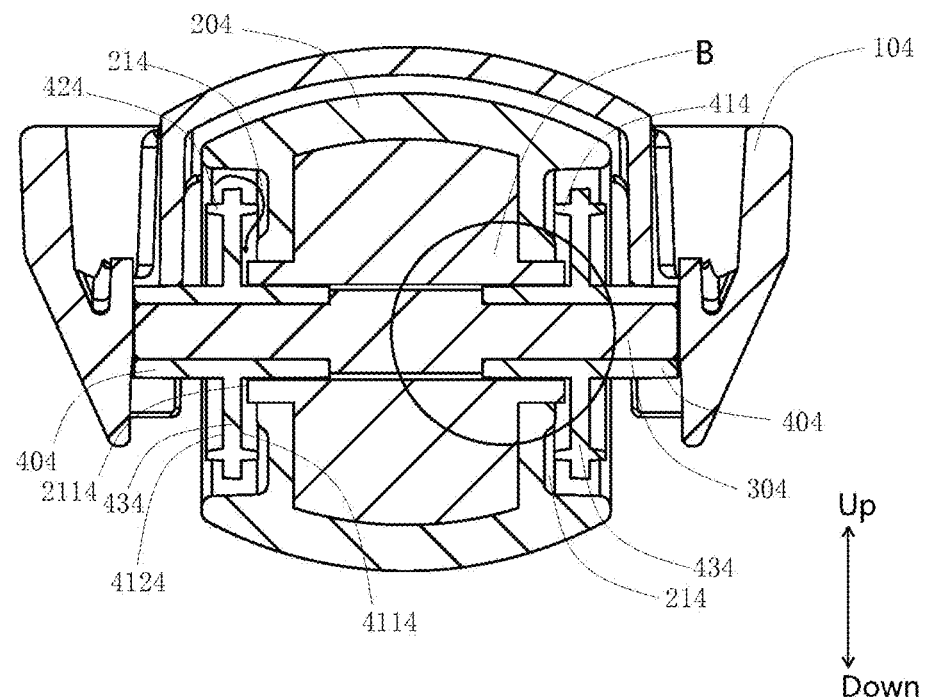
FIG. 20 is a cross-sectional view taken along an A-A line in FIG. 19.

As shown in FIG. 20, both ends of the universal wheel shaft 304 are non-rotatably provided with end cap shafts 404, the end cap shafts 404 include end cap bodies, and the end cap bodies are respectively located on two opposite sides of the universal wheel 204. Still referring to FIG. 20, each end cap body has a first blocking part 414, a second blocking part 424, and a third blocking part 434 between the first blocking part 414 and the second blocking part 424 arranged in an axial direction. A radial height of the third blocking part 434 is different from a radial height of the first blocking part 414 and a radial height of the second blocking part 424. The "radial height" here is a height in a direction of an arrow indicating an "up" or "down" direction shown in FIG. 20. In an embodiment of the present application, the first blocking part 414 is closer to the universal wheel 204 than the second blocking part 424. However, in other embodiments, the second blocking part may be closer to the universal wheel 204 than the first blocking part, provided that the radial height of the third blocking part located between the first blocking part and the second blocking part is different from the radial height of the first blocking part and the radial height of the second blocking part. Therefore, the radial height of the third blocking part 434 is different from the radial height of the first blocking part 414 and the radial height of the second blocking part 424, which not only blocks the entry of external impurities such as particles or entanglements, but also increases the length of a path for foreign particles to enter the universal wheel 204 (refer to the tortuous entry path indicated by the curved arrow in FIG. 20). As a result, it is not easy for foreign particles to enter the universal wheel 204, thus reducing wear and extending the service life of the universal wheel assembly.

Still referring to FIG. 20, to make the end cap shafts 404 better block particles or entanglements such as hair and fluff, accommodation portions 214 may be formed respectively by inwardly recessing shaft end faces at both ends of the universal wheel 204, and the end cap bodies are respectively located in the accommodation portions 214. In this case, the entry path mentioned above is an entry path formed between the end cap body and the accommodation portion.

Figure 24:
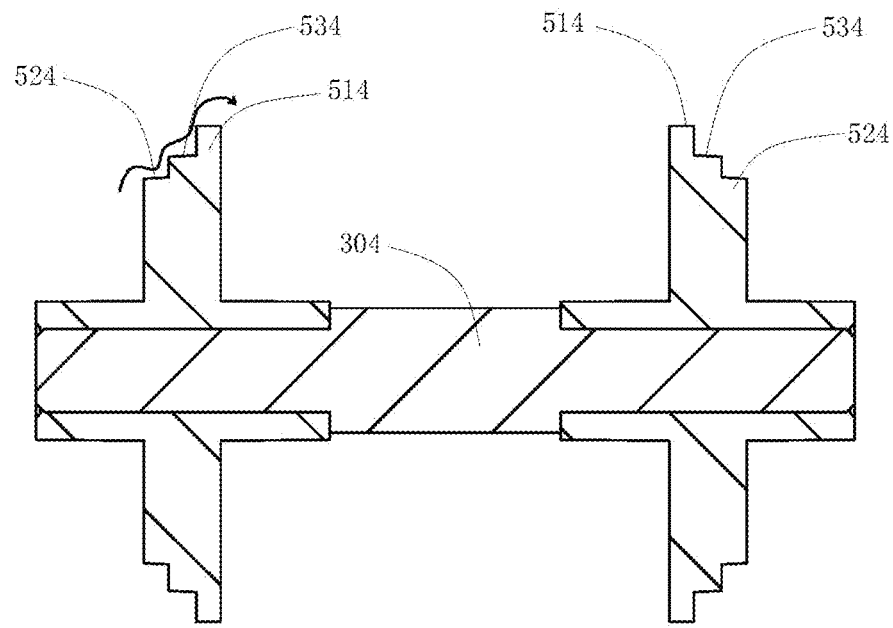
FIG. 24 is a schematic structural diagram of a first blocking part, a second blocking part, and a third blocking part according to an embodiment of the present application.
Figure 25:
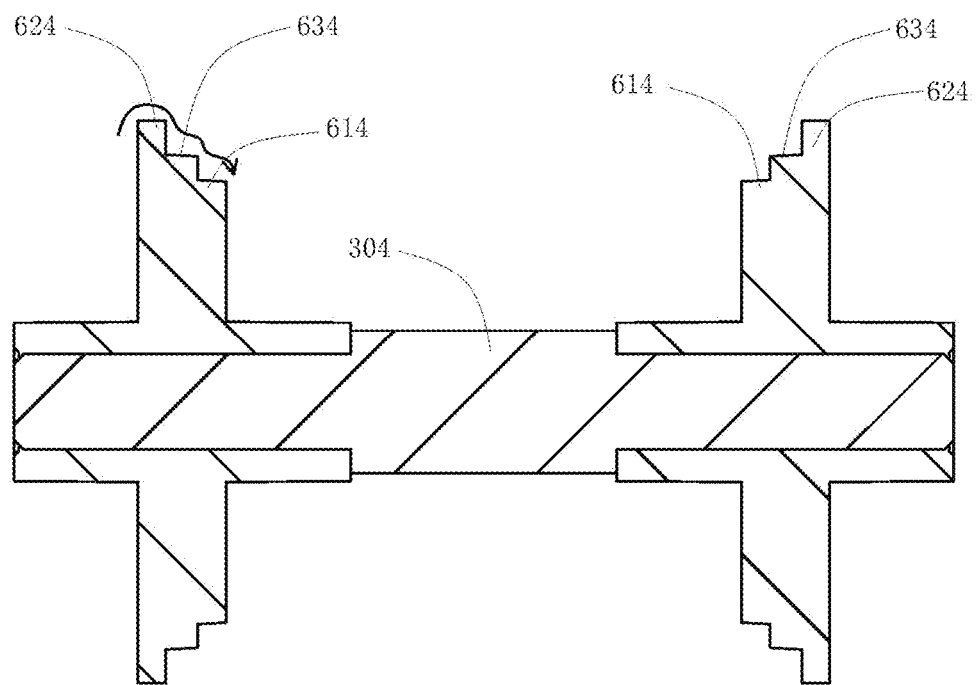
FIG. 25 is a schematic structural diagram of a first blocking part, a second blocking part, and a third blocking part according to an embodiment of the present application.

The radial height of the first blocking part 414 may be different from the radial height of the second blocking part 424. In this case, the first blocking part 414, the second blocking part 424, and the third blocking part 434 respectively have three different radial heights. Here is another optional embodiment. As shown in FIG. 24, the radial height of the first blocking part 514, the radial height of the third blocking part 534, and the radial height of the second blocking part 524 sequentially decrease. The first blocking part 514, the second blocking part 524, and the third blocking part 534 may be integrally formed disks with different diameters. In this case, the entry path is indicated by the arrow in FIG. 24. In still another optional embodiment, as shown in FIG. 25, it is possible that the radial height of the first blocking part 614, the radial height of the third blocking part 634, and the radial height of the second blocking part 624 sequentially increase. In this case, the entry path is indicated by the arrow in FIG. 25.

Certainly, in other embodiments, regardless of the radial heights of the first blocking part and the second blocking part, the radial height of the third blocking part may be greater than the radial heights of both the first blocking part and the second blocking part, or may be less than the radial heights of both the first blocking part and the second blocking part.

Figure 26:
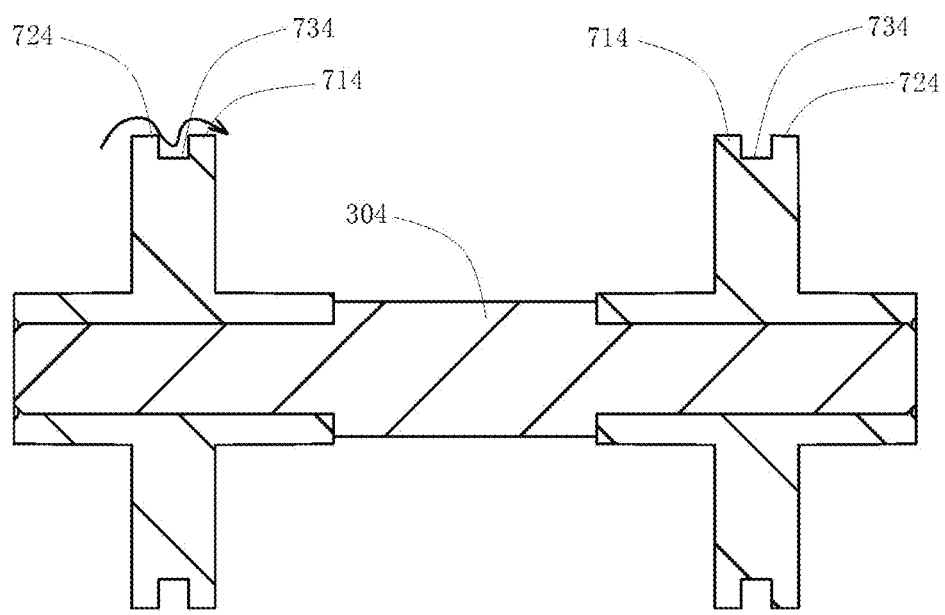
FIG. 26 is a schematic structural diagram of a first blocking part, a second blocking part, and a third blocking part according to an embodiment of the present application.

Still referring to FIG. 20, the radial height of the first blocking part 414 may be the same as the radial height of the second blocking part 424. In an embodiment of the present application, the radial height of the third blocking part 434 is greater than the radial height of the first blocking part 414 and the radial height of the second blocking part 424. In other embodiments, as shown in FIG. 26, the radial height of the third blocking part 734 may be less than the radial height of the first blocking part 714 and the radial height of the second blocking part 724. In this case, the first blocking part 714, the second blocking part 724, and the third blocking part 734 may be integrally formed disks with a larger middle diameter and smaller diameters on both sides, as shown in FIG. 26. In this case, the entry path is indicated by the arrow in FIG. 26.

The case in which the radial height of the third blocking part 434 is greater than the radial height of the first blocking part 414 and the radial height of the second blocking part 424 in an embodiment of the present application is further described in detail.

Figure 21:
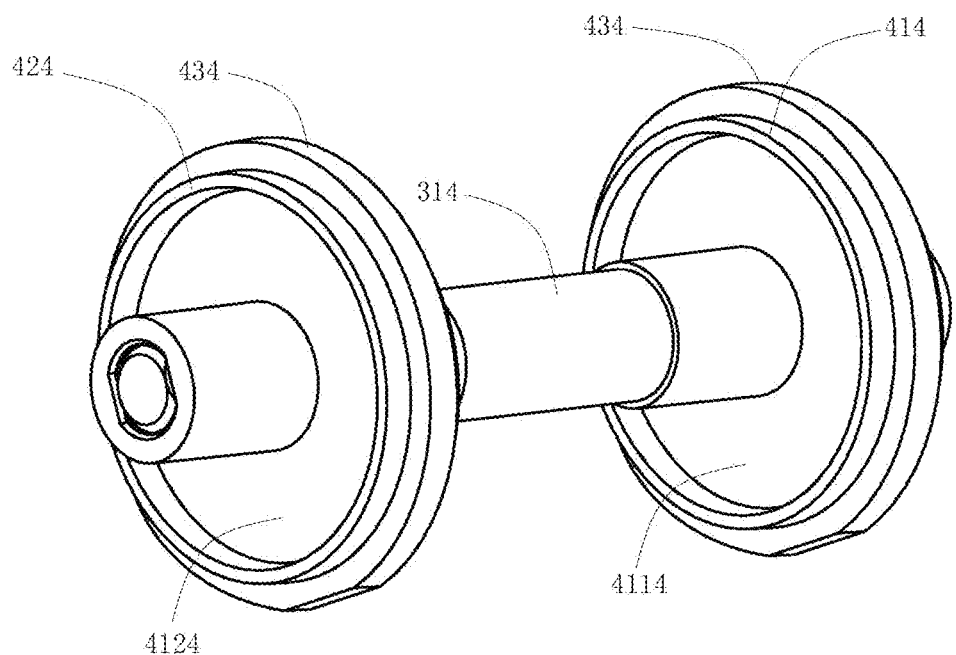
FIG. 21 is a three-dimensional diagram of a universal wheel shaft and end cap shafts at both ends of the universal wheel shaft shown in FIG. 20 after assembly.

As shown in FIG. 20 and FIG. 21, the third blocking part 434 includes a first surface 4114 facing the accommodation portion 214 and a second surface 4124 away from the accommodation portion 214. The first blocking part 414 is a first annular rib protruding from the first surface 4114, and the second blocking part 424 is a second annular rib protruding from the second surface 4124. The first annular rib and the second annular rib are arranged in a circular ring shape, or may be in irregular ring shapes in other embodiments. In an embodiment of the present application, the first annular rib and the second annular rib are symmetrically arranged with respect to the two opposite surfaces (the first surface 4114 and the second surface 4124) of the third blocking part 434, that is, the end cap shaft 404 may be designed as a symmetrical structure. Therefore, when the end cap shaft 404 is mounted on the universal wheel shaft 304, the mounting direction may not be considered. In addition, after the side of the end cap body close to the universal wheel 204 is worn, the direction may be changed for continued use.

Further, the accommodation portion 214 has a proximal surface 2114 that is closest to the first surface 4114 in the axial direction. A length of the first annular rib protruding in the axial direction is greater than an axial distance from the first surface 4114 to the proximal surface 2114. As a result, a tortuous entry path indicated by the arrow in FIG. 20 is formed, and it is difficult for foreign particles to enter between the universal wheel 204 and the universal wheel shaft 304.

Figure 22:
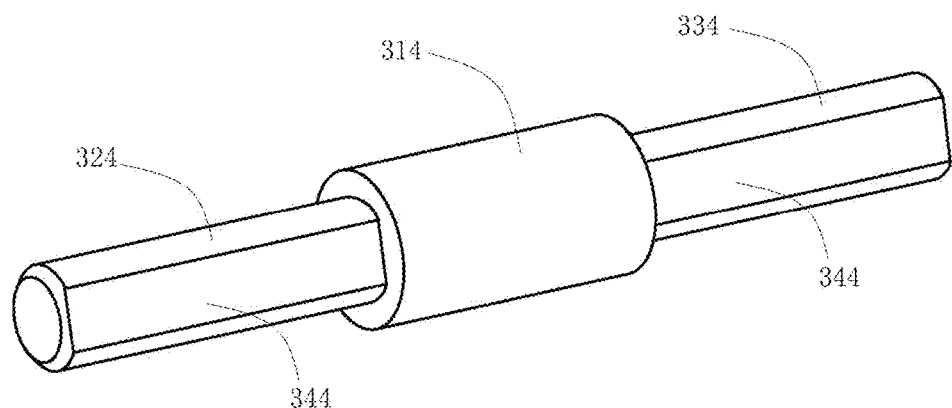
FIG. 22 is a three-dimensional diagram of a universal wheel shaft shown in FIG. 20.

The following describes a specific mounting structure between the end cap shaft 404 and the universal wheel shaft 304. In an embodiment of the present application, as shown in FIG. 20 to FIG. 22, the universal wheel shaft 304 includes a middle portion 314 and a first end portion 324 and a second end portion 334 extending from the middle portion 314 to both ends. The first end portion 324 and the second end portion 334 are both provided with a plane 344 in the axial direction, and a shaft hole of the end cap shaft 404 is provided with a plane that abuts against the plane 344, so that when the end cap shafts 404 are respectively sleeved on the first end portion 324 and the second end portion 334, they abut against the middle portion 314 and restrict relative movement between the end cap shaft 404 and the universal wheel shaft 304. The relative movement mentioned here means that the end cap shaft 404 cannot rotate or translate relative to the universal wheel shaft 304.

The plane 344 of the first end portion 324 may be symmetrically arranged on the first end portion 324, or there may be a plurality of planes 344 evenly arranged on the first end portion 324 in a circumferential direction. In this case, the plane 344 is arranged in the shaft hole of the end cap shaft 404 of the first end portion 324, provided that the abutment plane matches the plane 344. Similarly, the arrangement method for the plane 344 of the second end portion 334 is similar to the arrangement method for the plane 344 of the first end portion 324, and details are not described herein again.

Figure 23:
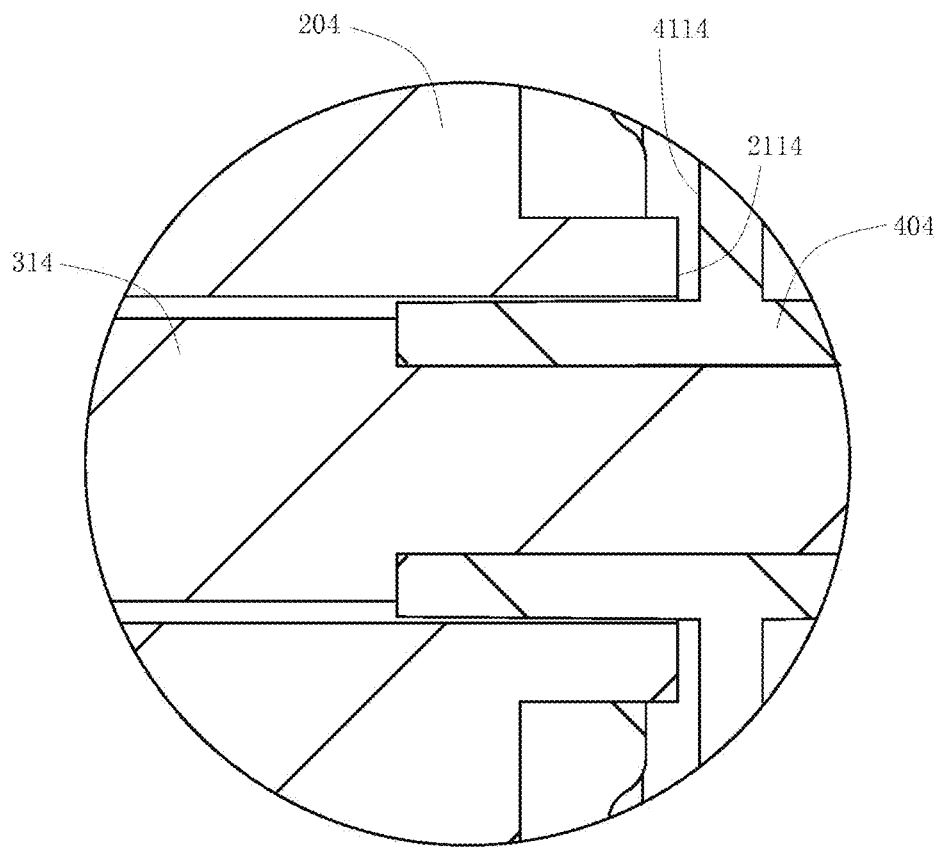
FIG. 23 is a partially enlarged view of part B of a universal wheel assembly shown in FIG. 20, showing a gap between an end cap shaft and a universal wheel, and a gap between a middle portion and a universal wheel.

Further, in a case where the end cap shafts 404 are mounted on the universal wheel shaft 304, and the universal wheel shaft 304 is in clearance fit with the universal wheel 204, the clearance in the radial direction may be further defined. Specifically, as shown in FIG. 20 and FIG. 23, the fitting clearance between the end cap shaft 404 and the universal wheel 204 may be smaller than the fitting clearance between the middle portion 314 and the universal wheel 204. Therefore, the small clearance between the end cap shaft 404 and the universal wheel 204 prevents large particles from entering it. In this case, because the clearance between the middle portion 314 and the universal wheel 204 is relatively large, the tiny particles that enter in the clearance between the middle portion 314 and the universal wheel 204 do not wear the universal wheel shaft 304.

Further, based on an actual use environment, the fitting clearance between the middle portion 314 and the universal wheel 204 may be 0.3 mm to 0.4 mm. More preferably, the fitting clearance between the middle portion 314 and the universal wheel 204 may be 0.35 mm.

The universal wheel assembly provided according to the embodiments of the present application can be mounted to an intelligent cleaning device, or can be mounted to any other device that has a function of moving, such as luggage, a movable door, or another intelligent device.

An embodiment of the present application further provides a universal wheel assembly (not shown) in another embodiment. The universal wheel assembly here differs from the universal wheel assembly in the foregoing embodiments in terms of the mounting structure of the end cap shaft and the universal wheel shaft.

Specifically, the universal wheel shaft is a rod shaft, and the end cap shafts are respectively sleeved on both ends of the universal wheel shaft, and are not rotatable relative to the universal wheel shaft. In this embodiment, because there is an axial distance between the end cap body and the accommodation portion (refer to FIG. 23), an elastic element (such as a spring) is arranged between the end cap shafts on the universal wheel shaft. The universal wheel assembly is constructed as follows: when the end cap shafts receive external force at the same time so that the end cap body abuts against the accommodation portion, the elastic element is in a compressed state: when the external force is removed, the elastic element returns to a natural state from the compressed state so that the end cap shaft is disassembled from the universal wheel shaft. Arranging the elastic element can assist in disassembling the end cap shaft from the universal wheel shaft.

The present application further provides an intelligent cleaning device, which may be an intelligent sweeping device, an intelligent mopping device, etc. The intelligent cleaning device includes a device body, and the device body generally has an approximately circular shape or may have other shapes. The device body includes a lower housing assembly and an upper housing assembly assembled with the lower housing assembly.

The intelligent cleaning device provided in the embodiments of the present application is usually equipped with a perception system, a control system, a driving system, a cleaning system, an energy system, and a man-machine interaction system. In addition, interfaces for electrical and mechanical connections may be reserved.

The perception system generally includes a position-determining apparatus and sensing apparatuses such as a bumper, a cliff sensor, an ultrasonic sensor, an infrared sensor, a magnetometer, an accelerometer, a gyroscope, and an odometer, and provides various location information and movement status information to the control system. The position-determining apparatus includes but is not limited to a camera and a laser distance sensor (LDS).

The control system generally includes non-transitory memories such as a hard disk, a flash memory, and a random access memory, and computing processors for communication, such as a central processing unit and an application processor. The application processor builds, based on obstacle information returned by a laser ranging apparatus and by using a positioning algorithm such as Simultaneous Localization And Mapping (SLAM), an instant map of an environment in which the intelligent cleaning device is located. With reference to distance information and velocity information returned by sensing apparatuses such as the bumper, the cliff sensor, the ultrasonic sensor, the infrared sensor, the magnetometer, the accelerometer, the gyroscope, and the odometer, the control system comprehensively determines a current working status of the sweeping machine, such as crossing a threshold, crossing an edge of a carpet, reaching a cliff, getting stuck, having a full waste container, or being picked up. In addition, the control system provides next-action strategies, based on different situations, to make the performance of the intelligent cleaning device meet a certain requirement of the user and improve user experience.

The driving system may control, based on a driving command including distance and angle information, the intelligent cleaning device as it moves across the floor. The driving system includes the universal wheel assembly in any one of the foregoing embodiments, a driving motor, and a control circuit that controls the driving motor. The rotating shaft of the universal wheel assembly can be driven to rotate by the driving motor of the intelligent cleaning device, so that the universal wheel assembly is rotatable.

The cleaning system may be a dry cleaning system and/or a wet cleaning system. The dry cleaning system plays the function of sweeping, and includes a rolling brush, a waste container, a vacuum, an air outlet, and connecting parts between the four parts. The rolling brush comes in contact with the floor, the debris on the floor surface is agitated and taken to a suction door between the rolling brush and the waste container, and then sucked into the waste container by suction force that is generated by the vacuum.

The energy system generally includes rechargeable batteries such as NiMH batteries and lithium batteries. The rechargeable batteries can be connected to a charging-control circuit, a battery pack-charging temperature detection circuit, and a battery undervoltage monitoring circuit. The charging-control circuit, the battery pack-charging temperature detection circuit, and the battery undervoltage monitoring circuit are connected to a single-chip microcomputer control circuit. The device body is usually charged by connecting a charging electrode to the charging station.

The man-machine interaction system generally includes buttons on a panel of the intelligent cleaning device, which are employed by the user to select functions. The man-machine interaction system may further include a display screen, an indicator, and/or a speaker, which provide the current status of the machine or function options for the user.

The man-machine interaction system may further include a mobile phone application. For a route-navigated cleaning device, the mobile phone application can show a map of the environment in which the device is located, as well as the location of the intelligent cleaning device, to the user, thereby providing the user with abundant and user-friendly function options.

Unless otherwise defined, the technical and scientific terms used in this specification have the same meanings as those commonly understood by a person skilled in the art of the present application. The terms used in this specification are merely for the purpose of describing specific implementation, and are not intended to limit the present application. Terms such as "portion" and "part" that appear in this specification may represent either a single part or a combination of multiple parts. Terms such as "mount" and "arrange" that appear in this specification may indicate that one part is attached directly to another part, or may indicate that one part is attached to another part by using an intermediate part. In this specification, a feature described in one embodiment may be applied to another embodiment individually or in combination with other features, unless the feature is not applicable or otherwise stated in the another embodiment.

The present application has been described by using the foregoing embodiments, but it should be understood that the foregoing embodiments are used only for the purposes of illustration and description, and are not intended to limit the present application to the scope of the described embodiments. In addition, a person skilled in the art may understand that the present application is not limited to the foregoing embodiments, and further variations and modifications may be made according to the teachings of the present application. These variations and modifications fall within the protection scope of the present application.

What is claimed is:

1. A universal wheel assembly, comprising:
   a rotating shaft support, wherein the rotating shaft support is configured to be fixed to a predetermined mounting position; and
   a universal wheel support, wherein the universal wheel support is connected to the rotating shaft support and is rotatable relative to the rotating shaft support, wherein
   the universal wheel support is provided with a through hole, and the through hole is used for a mounting tool to pass through to fix the rotating shaft support to the predetermined mounting position;
   the universal wheel assembly is further provided with a rotating shaft for connecting the rotating shaft support and the universal wheel support;
   the rotating shaft support is provided with a mounting hole, and a distance between a center line of the mounting hole and a rotation axis of the rotating shaft is equal to a distance between a center line of the through hole and the rotation axis of the rotating shaft, so as to more accurately fix the rotating shaft support to the predetermined mounting position;
   stopper ribs are evenly arranged on the rotating shaft support around a center line of the rotating shaft support in a circumferential direction;
   the rotating shaft support is provided with an elastic buckle, the elastic buckle is squeezed to a deformed position when the rotating shaft is inserted into the rotating shaft support, and the elastic buckle is reset to an initial position by means of elastic force when the rotating shaft is inserted in place, to restrict movement of the rotating shaft toward the universal wheel support; and
   the rotating shaft support, the stopper ribs, and the elastic buckle are a monolithic one-piece construction.

2. The universal wheel assembly according to claim 1, wherein the through hole is used for the mounting tool to pass through to operate a connecting part passing through the mounting hole, thereby fixing the rotating shaft support to the predetermined mounting position.

3. The universal wheel assembly according to claim 2, wherein a diameter of the through hole is larger than a diameter of the mounting hole.

4. The universal wheel assembly according to claim 2, wherein the rotating shaft support is provided with a mounting plate on a plane on which the universal wheel support rotates, and the mounting hole is arranged on the mounting plate.

5. The universal wheel assembly according to claim 4, wherein there are at least two mounting holes.

6. The universal wheel assembly according to claim 1, wherein the rotating shaft and a universal wheel are mounted on the universal wheel support, the universal wheel is detachably connected to the universal wheel support, and the rotating shaft is connected to the universal wheel support and the rotating shaft support, and is rotatable relative to the rotating shaft support.

7. The universal wheel assembly according to claim 6, wherein the rotating shaft and the rotating shaft support are coaxially arranged.

8. The universal wheel assembly according to claim 6, wherein the rotating shaft is made of metal material, and the rotating shaft and the universal wheel support are integrally injection molded.

9. The universal wheel assembly according to claim 6, wherein the elastic buckle comprises a hook portion, the rotating shaft comprises a stopper recess, and the hook portion cooperates with the stopper recess to restrict movement of the rotating shaft toward the universal wheel support.

10. The universal wheel assembly according to claim 7, wherein the elastic buckle comprises a hook portion, the rotating shaft comprises a stopper recess, and the hook portion cooperates with the stopper recess to restrict movement of the rotating shaft toward the universal wheel support.

11. The universal wheel assembly according to claim 8, wherein the elastic buckle comprises a hook portion, the rotating shaft comprises a stopper recess, and the hook portion cooperates with the stopper recess to restrict movement of the rotating shaft toward the universal wheel support.

12. A smart cleaning device, comprising a universal wheel assembly, wherein the universal wheel assembly is arranged at a bottom of the smart cleaning device and comprises:
   a rotating shaft support, wherein the rotating shaft support is configured to be fixed to a predetermined mounting position; and
   a universal wheel support, wherein the universal wheel support is connected to the rotating shaft support and is rotatable relative to the rotating shaft support, wherein
   the universal wheel support is provided with a through hole, and the through hole is used for a mounting tool to pass through to fix the rotating shaft support to the predetermined mounting position;

the universal wheel assembly is further provided with a rotating shaft for connecting the rotating shaft support and the universal wheel support;

the rotating shaft support is provided with a mounting hole, and a distance between a center line of the mounting hole and a rotation axis of the rotating shaft is equal to a distance between a center line of the through hole and the rotation axis of the rotating shaft, so as to more accurately fix the rotating shaft support to the predetermined mounting position;

stopper ribs are evenly arranged on the rotating shaft support around a center line of the rotating shaft support in a circumferential direction;

the rotating shaft support is provided with an elastic buckle, the elastic buckle is squeezed to a deformed position when the rotating shaft is inserted into the rotating shaft support, and the elastic buckle is reset to an initial position by means of elastic force when the rotating shaft is inserted in place, to restrict movement of the rotating shaft toward the universal wheel support; and the rotating shaft support, the stopper ribs, and the elastic buckle are a monolithic one-piece construction.

13. The smart cleaning device according to claim 12, wherein the stopper ribs match the bottom of the smart cleaning device.

* * * * *